US012581211B2

(12) United States Patent
Hanzawa et al.

(10) Patent No.: US 12,581,211 B2
(45) Date of Patent: Mar. 17, 2026

(54) IMAGING CIRCUIT AND IMAGING DEVICE

(71) Applicant: SONY SEMICONDUCTOR SOLUTIONS CORPORATION, Kanagawa (JP)

(72) Inventors: Katsuhiko Hanzawa, Kanagawa (JP); Hirotsugu Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 152 days.

(21) Appl. No.: 17/798,250

(22) PCT Filed: Feb. 17, 2021

(86) PCT No.: PCT/JP2021/006006
§ 371 (c)(1),
(2) Date: Aug. 8, 2022

(87) PCT Pub. No.: WO2021/172145
PCT Pub. Date: Sep. 2, 2021

(65) Prior Publication Data
US 2023/0108619 A1 Apr. 6, 2023

(30) Foreign Application Priority Data
Feb. 26, 2020 (JP) ................................. 2020-030964

(51) Int. Cl.
*H04N 25/47* (2023.01)
*H04N 25/70* (2023.01)
(Continued)

(52) U.S. Cl.
CPC ............ *H04N 25/47* (2023.01); *H04N 25/70* (2023.01); *H04N 25/701* (2023.01); *H04N 25/702* (2023.01); *H04N 25/707* (2023.01)

(58) Field of Classification Search
None
See application file for complete search history.

(56) References Cited

U.S. PATENT DOCUMENTS

| | | | |
|---|---|---|---|
| 7,164,443 B1 | 1/2007 | Hagihara | |
| 2008/0135731 A1 | 6/2008 | Lichtsteiner et al. | |
| (Continued) | | | |

FOREIGN PATENT DOCUMENTS

| | | |
|---|---|---|
| CN | 102298893 A | 12/2011 |
| CN | 103533259 A | 1/2014 |
| (Continued) | | |

OTHER PUBLICATIONS

International Search Report and Written Opinion prepared by the Japan Patent Office on Apr. 2, 2021, for International Application No. PCT/JP2021/006006, 3 pgs.
(Continued)

*Primary Examiner* — Twyler L Haskins
*Assistant Examiner* — Wesley J Chiu
(74) *Attorney, Agent, or Firm* — SHERIDAN ROSS P.C.

(57) ABSTRACT

To provide an imaging circuit and an imaging device capable of achieving switching of output types while a circuit scale is reduced. An imaging circuit according to the present disclosure includes: a photoelectric conversion element that converts incident light into a photocurrent; a first transistor that converts the photocurrent into a voltage signal; a second transistor that amplifies the voltage signal; a third transistor that controls a current to be supplied to the first transistor; and a fourth transistor that is connected to the second transistor.

17 Claims, 44 Drawing Sheets

(51) Int. Cl.
    *H04N 25/701*      (2023.01)
    *H04N 25/702*      (2023.01)
    *H04N 25/707*      (2023.01)

(56) References Cited

U.S. PATENT DOCUMENTS

| | | | |
|---|---|---|---|
| 2009/0040349 A1* | 2/2009 | Xu | H04N 25/767 |
| | | | 348/E5.091 |
| 2010/0289932 A1 | 11/2010 | Hashimoto | |
| 2013/0321683 A1* | 12/2013 | Sonoda | H04N 25/75 |
| | | | 348/301 |
| 2015/0109506 A1* | 4/2015 | Aibara | H04N 25/75 |
| | | | 348/308 |
| 2016/0227135 A1* | 8/2016 | Matolin | H04N 25/77 |
| 2017/0059399 A1 | 3/2017 | Suh et al. | |
| 2019/0051680 A1* | 2/2019 | Hanzawa | H04N 25/573 |
| 2020/0084403 A1* | 3/2020 | Suh | H04N 25/75 |
| 2020/0128205 A1 | 4/2020 | Sakakibara et al. | |
| 2020/0195863 A1* | 6/2020 | Shim | H04N 25/53 |
| 2022/0141403 A1* | 5/2022 | Mandelli | H04N 25/47 |
| | | | 348/207.99 |
| 2022/0208816 A1* | 6/2022 | Hirase | H04N 25/78 |
| 2023/0106422 A1* | 4/2023 | Sasaki | H04N 25/766 |
| | | | 348/308 |

FOREIGN PATENT DOCUMENTS

| | | | |
|---|---|---|---|
| CN | 106412453 A | 2/2017 |
| CN | 108702469 A | 10/2018 |
| CN | 109729291 A | 5/2019 |
| JP | 2001168311 A | 6/2001 |
| JP | 2009-508085 | 2/2009 |
| JP | 2009069644 A | 4/2009 |
| JP | 2010148312 A | 7/2010 |
| JP | 2011181595 A | 9/2011 |
| JP | 2016-533140 | 10/2016 |
| JP | 2017-050853 | 3/2017 |
| JP | 2017143657 A | 8/2017 |
| JP | 2019-092022 | 6/2019 |
| JP | 2019-134271 | 8/2019 |
| WO | WO 2018/198691 | 11/2018 |
| WO | WO 2019/239722 | 12/2019 |

OTHER PUBLICATIONS

Blasco, J. et al., "Modeling of the switching I-V characteristics in ultrathin (5 nm) atomic layer deposited HfO2 films using the logistic hysteron", Journal of Vacuum Science & Technology B, Jan. 2015.
Guo Feng, et al., "Design of a Wideband CMOS Variable Gain Amplifier" Journal of Semiconductors, vol. 28 No. 12, Dec. 15, 2007.

\* cited by examiner

Fig. 9

| PORTION | LOGARITHMIC OUTPUT | LINEAR OUTPUT |
|---|---|---|
| RST | POWER SOURCE POTENTIAL | PULSE VOLTAGE |
| PBias | CURRENT SOURCE BIAS | GROUND POTENTIAL |
| SWx | O N | O N |
| SWITCH 40 | O N | O F F |
| SWITCH 41 | O F F | O N |

Fig. 11

| PORTION | LOGARITHMIC OUTPUT | LINEAR OUTPUT |
|---------|--------------------|--------------------|
| RST | POWER SOURCE POTENTIAL | PULSE VOLTAGE |
| PBias | CURRENT SOURCE BIAS | GROUND POTENTIAL |
| Nbias | POWER SOURCE POTENTIAL | CURRENT SOURCE BIAS |
| LogEN | ON | OFF |
| LinEN | OFF | ON |

Fig. 13

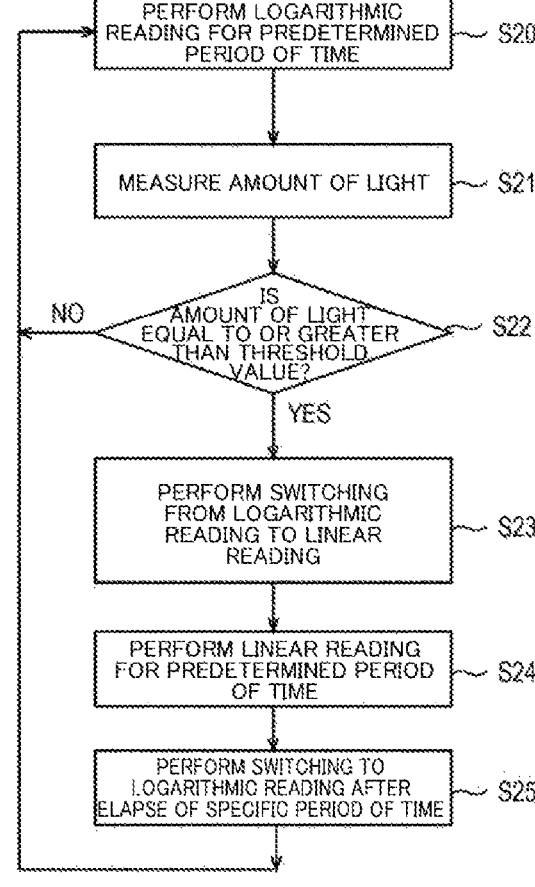

PERFORM LOGARITHMIC READING FOR PREDETERMINED PERIOD OF TIME — S20

MEASURE AMOUNT OF LIGHT — S21

IS AMOUNT OF LIGHT EQUAL TO OR GREATER THAN THRESHOLD VALUE? — S22

NO

YES

PERFORM SWITCHING FROM LOGARITHMIC READING TO LINEAR READING — S23

PERFORM LINEAR READING FOR PREDETERMINED PERIOD OF TIME — S24

PERFORM SWITCHING TO LOGARITHMIC READING AFTER ELAPSE OF SPECIFIC PERIOD OF TIME — S25

CONFIGURATION IN WHICH OUTPUT TYPES CAN
BE SELECTED BY DETECTION CIRCUIT

Fig. 24

| PORTION | LOGARITHMIC OUTPUT | LINEAR OUTPUT |
|---|---|---|
| RSTx | POWER SOURCE POTENTIAL | PULSE VOLTAGE |
| PBias | CURRENT SOURCE BIAS | GROUND POTENTIAL |
| SWxL | LOW(OFF) | HIGH(ON) |
| SWxD | HIGH(ON) | LOW(OFF) |
| SWITCH 40 | O F F | O F F |
| SWITCH 41 | O N | O N |

IN CASE OF CONFIGURATION IN WHICH OUTPUT
TYPE CAN BE SELECTED BY DETECTION CIRCUIT

IMAGING CIRCUIT AND IMAGING DEVICE

CROSS REFERENCE TO RELATED APPLICATIONS

This application is a national stage application under 35 U.S.C. 371 and claims the benefit of PCT Application No. PCT/JP2021/006006, having an international filing date of 17 Feb. 2021, which designated the United States, which PCT application claimed the benefit of Japanese Patent Application No. 2020-030964, filed 26 Feb. 2020, the entire disclosures of each of which are incorporated herein by reference.

TECHNICAL FIELD

The present disclosure relates to an imaging circuit and an imaging device.

BACKGROUND ART

In typical imaging devices, synchronous-type imaging elements that capture image data (frames) at timings of synchronization signals are often used. However, the synchronous-type imaging elements can obtain the image data only at cycle times (every $\frac{1}{60}$ seconds, for example) of the synchronization signals and are not suitable for applications acquiring image data at higher speeds. Thus, asynchronous-type imaging elements have been proposed. Pixels of asynchronous-type imaging elements have an event detection circuit capable of detecting, for each address, that the amount of light exceeds a threshold value as an event in real time.

CITATION LIST

Patent Literature

[PTL 1]
  JP 2016-533140 T

SUMMARY

Technical Problem

Asynchronous-type solid-state imaging elements can generate and output data at higher speeds than synchronous-type solid-state imaging elements. Utilization of asynchronous-type solid-state imaging elements can improve safety by executing processing of performing image recognition of persons or obstacles at higher speeds in the field of transportation, for example. However, there is a problem that provision of an address event detection circuit and a synchronization-type detection circuit in each pixel may lead to an increase in installation area.

The present disclosure provides an imaging circuit and an imaging device capable of switching types of outputs while the circuit scale is reduced.

Solution to Problem

An aspect of an imaging circuit according to the present disclosure may include: a photoelectric conversion element that converts incident light into a photocurrent; a first transistor that converts the photocurrent into a voltage signal; a second transistor that amplifies the voltage signal;

a third transistor that controls a current to be supplied to the first transistor; and a fourth transistor that is connected to the second transistor.

The imaging circuit may further include: a fifth transistor that is connected between a first node that couples a control electrode of the first transistor to a first terminal of the second transistor and a first reference potential.

A buffer, a subtracter, and a quantizer may be further connected to a stage subsequent to the first node.

A control unit that is configured to be able to achieve switching between a first mode in which the third transistor and the fourth transistor are turned on and the fifth transistor is used as a current source and a second mode in which a pulse voltage is applied to a control electrode of the third transistor, the fourth transistor is turned on, and the fifth transistor is turned off may be further included.

The control unit may be configured to achieve switching between the first mode and the second mode in accordance with the measured amount of light.

A sixth transistor that is connected between the photoelectric conversion element and a second node that couples a first terminal of the first transistor to a control electrode of the second transistor may be further included.

The first transistor and the second transistor may be included in a multi-stage logarithmic transformation circuit.

A sixth transistor that is connected between a third node that couples the second terminal of the second transistor and a second terminal of the fourth transistor and a second reference potential may be further included.

A control unit that is configured to be able to achieve switching between a first mode in which the third transistor is turned on, the fourth transistor is turned off, the fifth transistor is used as a current source, and the sixth transistor is turned on and a second mode in which a pulse voltage is applied to a control electrode of the third transistor, the fourth transistor is turned on, the fifth transistor is turned off, and the sixth transistor is turned off may be further included.

A first switch with a stage therebefore to which the control electrode of the first transistor and the first terminal of the second transistor are connected and a second switch with a stage therebefore to which a second terminal of the second transistor and a first terminal of the fourth transistor are connected may be further included, and the fourth transistor may be connected between the second transistor and a second reference potential.

A buffer, a subtracter, and a quantizer may be connected to a stage subsequent to the first switch, and an analog-digital converter may be connected to a stage subsequent to the second switch.

A control unit that is configured to be able to achieve switching between a first mode in which the third transistor and the fourth transistor are turned on, the fifth transistor is used as a current source, the first switch is turned on, and the second switch is turned off and a second mode in which a pulse voltage is applied to a control electrode of the third transistor, the fourth transistor is turned on, the fifth transistor is turned off, the first switch is turned off, and the second switch is turned on may be further included.

The photoelectric conversion element and the fifth transistor may be mounted on different chips or substrates.

An imaging device according to an aspect of the present disclosure may include: an analog-digital converter; and a plurality of the imaging circuits, in which the first terminal of the fourth transistor in each of the imaging circuits may be connected to the analog-digital converter via a signal line.

A third switch, a fourth switch, and a current source may be further included, the third switch may be connected between the signal line and a second reference potential, and the fourth switch and the current source may be connected in series between the signal line and the second reference potential.

A control unit that is configured to be able to achieve switching between a first mode in which the third transistor and the fourth transistor are turned on, the fifth transistor is used as a current source, the third switch is turned on, and the fourth switch is turned off and a second mode in which a pulse voltage is applied to a control electrode of the third transistor, the fourth transistor is turned on, the fifth transistor is turned off, the third switch is turned on, and the fourth switch is turned off may be further included.

The control unit may be configured to achieve switching between the first mode and the second mode in accordance with the measured amount of light.

Floating diffusion layers of the at least two imaging circuits may be connected via a seventh transistor.

The second terminals of the first transistors in the at least two imaging circuits may be connected via an eighth transistor.

The photoelectric conversion elements, the first transistors, the second transistors, the third transistors, and the fourth transistors of the plurality of imaging circuits may be mounted on the same chip or substrate.

BRIEF DESCRIPTION OF DRAWINGS

FIG. 9 is a table illustrating a setting example of the circuit in FIG. 8.

FIG. 11 is a table illustrating a setting example of the circuit in FIG. 10.

FIG. 13 is a flowchart illustrating an example of processing for switching between logarithm reading and linear reading.

FIG. 24 is a table illustrating a setting example of the circuit in FIG. 23.

DESCRIPTION OF EMBODIMENTS

Figure 1:
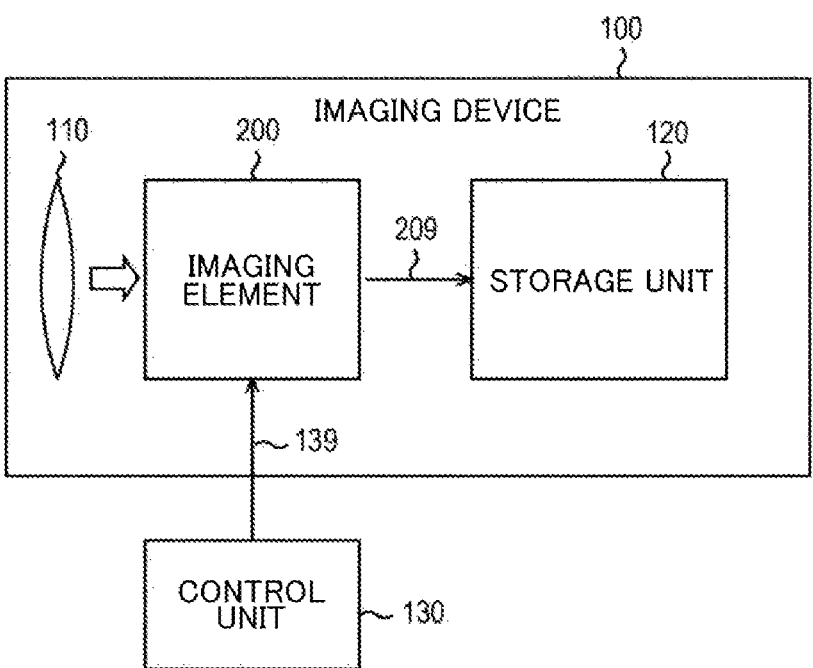
FIG. 1 is a block diagram illustrating a configuration example of an imaging device according to the present disclosure.

Preferred embodiments of the present disclosure will be described in detail with reference to the accompanying figures below. Also, in the present specification and the figures, components having substantially the same functional configuration will be denoted by the same reference numerals, and thus repeated descriptions thereof will be omitted.

[Configuration Example of Imaging Device]

FIG. 1 is a block diagram illustrating a configuration example of an imaging device according to the present disclosure. An imaging device 100 in FIG. 1 includes an imaging lens 110, an imaging element 200, a storage unit 120, and a control unit 130. The imaging device 100 is a camera mounted in a wearable device or an in-vehicle camera, for example.

The imaging lens 110 collects incident light on the imaging element 200.

The imaging element 200 includes a plurality of pixels. Each of the plurality of pixels generates an address event in a case in which an absolute value of the amount of change in luminance exceeds a threshold value. The address event includes, for example, an ON event and an OFF event. Here, the ON event indicates that a detected luminance has exceeded a first threshold value. The OFF event indicates that the detected luminance has fallen below a second threshold value. For example, it is possible to use a value that is larger than a reference value as the first threshold value. Also, it is possible to use a value that is smaller than the reference value as the second threshold value. However, a method of setting the first threshold value and the second threshold value are not limited.

Each pixel of the imaging element 200 outputs a detection signal indicating a result of detecting an address event. Each detection signal includes, for example, an ON event detection signal VCH indicating presence/absence of an ON event and an OFF event detection signal VCL indicating presence/absence of an OFF event. Note that the pixels in the imaging element 200 may detect both the ON event and the OFF event as targets or may detect either one of these events as a target.

The imaging element 200 can generate image data from the detection signals. Also, the imaging element 200 executes predetermined processing such as recognition processing on the image data. Then, the imaging element 200 outputs data after the processing to the storage unit 120 via a signal line 209.

The storage unit 120 is adapted to record the data output from the imaging element 200. The control unit 130 controls the imaging element 200 and realizes capturing of image data at a desired timing.

[Configuration Example of Imaging Element]

Figure 2:
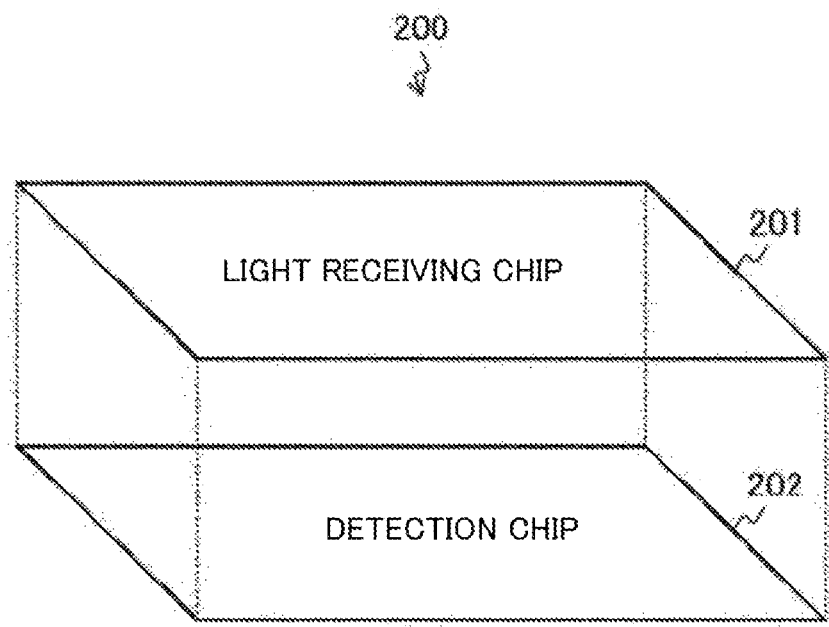
FIG. 2 is a diagram illustrating an example of a lamination structure of an imaging element.

FIG. 2 illustrates an example of a lamination structure of the imaging element 200. The imaging element 200 in FIG. 2 includes a detection chip 202 and a light receiving chip 201 laminated on the detection chip 202. It is possible to establish electrical connection between these chips via connecting portion such as a via. The electrical connection is not limited to a via and may be achieved by Cu—Cu bonding or a bump.

Figure 3:
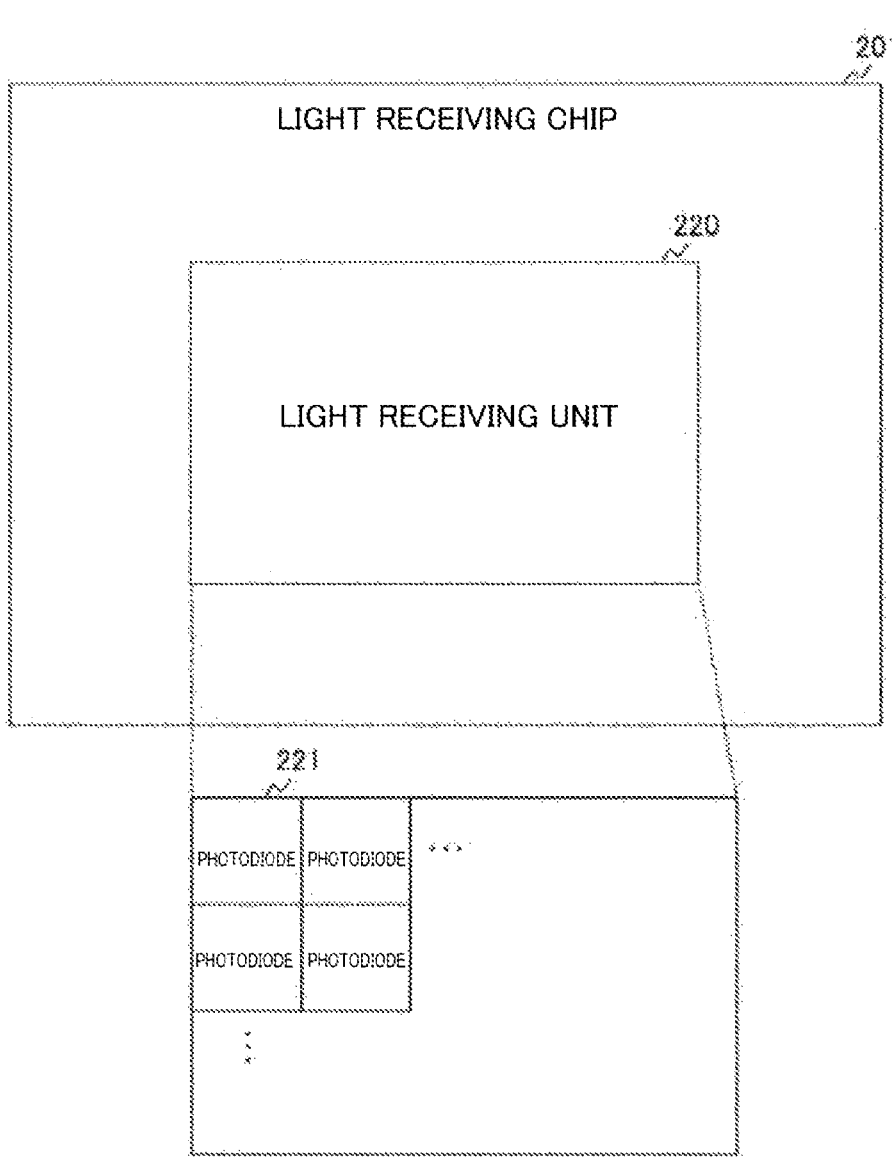
FIG. 3 is a plan view illustrating an example of a light receiving chip according to the present disclosure.

FIG. 3 is a plan view illustrating an example of the light receiving chip 201. The light receiving chip 201 is provided with a light receiving unit 220. A plurality of photodiodes 221 are aligned in a two-dimensional grid shape in the light receiving unit 220. The photodiodes 221 are configured to perform photoelectric conversion on incident light to generate a photocurrent. A pixel address including a row address and a column address is allocated to each of these photodiodes 221. Therefore, it is possible to perform various kinds of control by designating a row address, a column address, or a pixel address.

Figure 4:
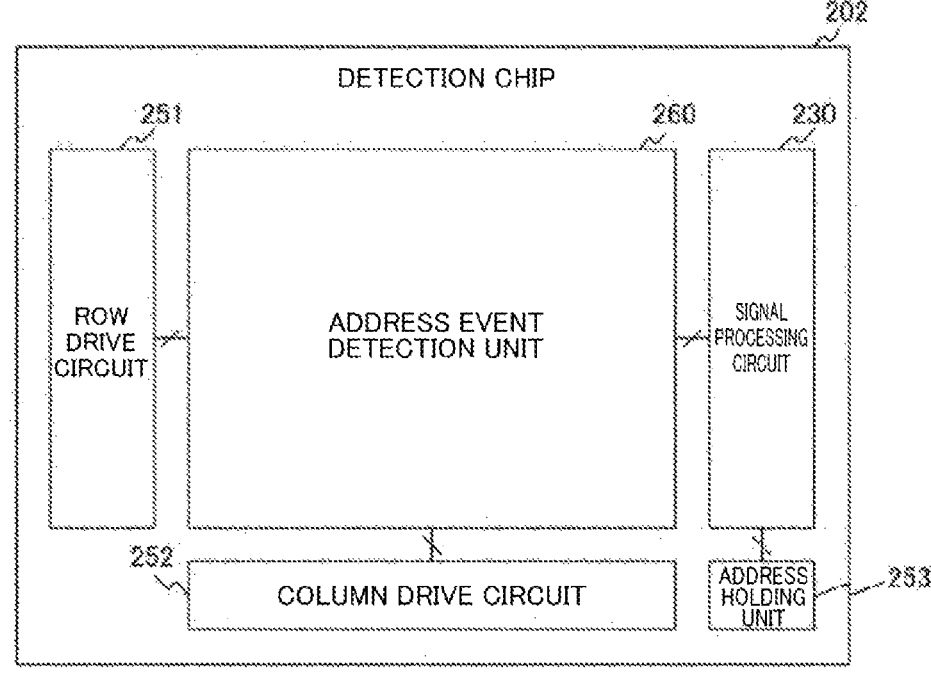
FIG. 4 is a plan view illustrating an example of a detection chip according to the present disclosure.

FIG. 4 is a plan view illustrating an example of the detection chip 202. The detection chip 202 in FIG. 4 includes a signal processing circuit 230, a row drive circuit 251, a column drive circuit 252, an address holding unit 253, and an address event detection unit 260.

The address event detection unit 260 generates an address event when an absolute value of the amount of change in luminance for each of the plurality of photodiodes 221 (pixels) has exceeded a predetermined threshold value. Then, the address event detection unit 260 generates a detection signal indicating a result of detecting an address event for each pixel. Then, the address event detection unit 260 inputs a detection signal in accordance with an enable signal to the signal processing circuit 230.

Here, the enable signal is a signal for designating whether or not to activate an output of a detection signal for each pixel. In a case in which the enable signal has a waveform of activating an output, a detection signal is output from a corresponding pixel. On the other hand, no detection signal is output from a corresponding pixel in a case in which the enable signal has a waveform that inactivates the output.

The row drive circuit 251 is configured to select a row address and output a detection signal corresponding to the row address to the address event detection unit 260.

The column drive circuit 252 is configured to select a column address and causes a detection signal corresponding to the column address to be output to the address event detection unit 260.

The address holding unit 253 is configured to hold a pixel address of a defective pixel where an abnormality has occurred.

The signal processing circuit 230 is adapted to execute predetermined signal processing on a detection signal from the address event detection unit 260. The signal processing circuit 230 aligns detection signals as pixel signals in a two-dimensional grid shape and acquires image data. Then, the signal processing circuit 230 executes signal processing such as image recognition processing on the image data.

Note that the signal processing circuit 230 may have a function of acquiring a frequency at which an address event is detected for each pixel and specifying a defective pixel on the basis of the statistical amount of the detection frequency. In this case, the signal processing circuit 230 holds the pixel address of the defective pixel in the address holding unit 253. Also, the signal processing circuit 230 generates an enable signal for each pixel and supplies the enable signal to the address event detection unit 260. As the enable signal corresponding to the defective pixel, an enable signal with a waveform that inactivates an output is output.

Figure 5:
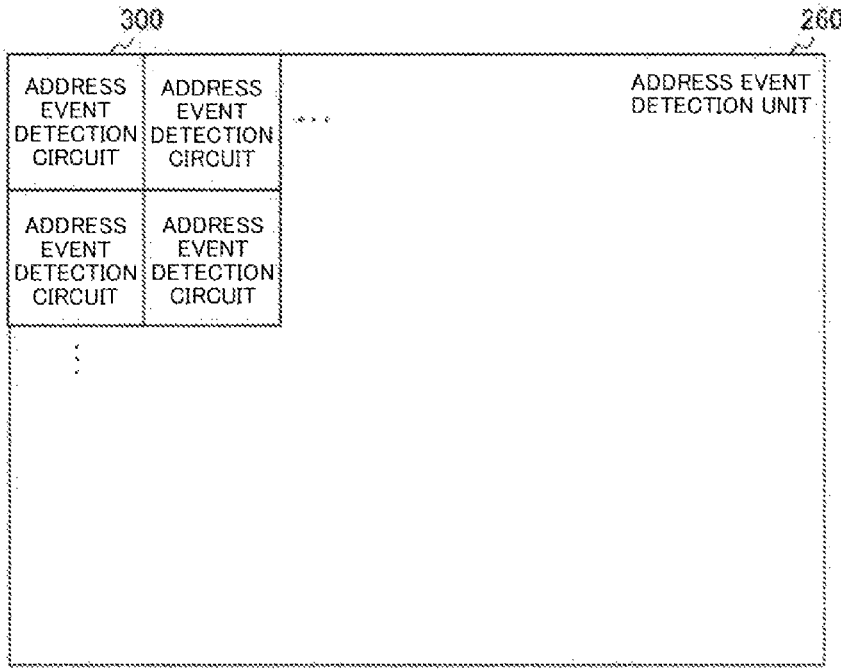
FIG. 5 is a plan view illustrating an example of an address event detection unit.

FIG. 5 is an example of a plan view of the address event detection unit 260. In the address event detection unit 260 in FIG. 5, a plurality of address event detection circuits 300 are aligned in a two-dimensional grid shape. A pixel address is allocated to each address event detection circuit 300. Also, the address event detection circuits 300 are connected to photodiodes 221 with the same addresses or corresponding addresses.

The address event detection circuits 300 are configured to quantize voltage signals in accordance with photocurrents from the corresponding photodiode 221. Also, the address event detection circuits 300 are configured to output, as detection signals, voltage signals quantized in accordance with the enable signals.

[Configuration Example of Address Event Detection Circuit]

Figure 6:
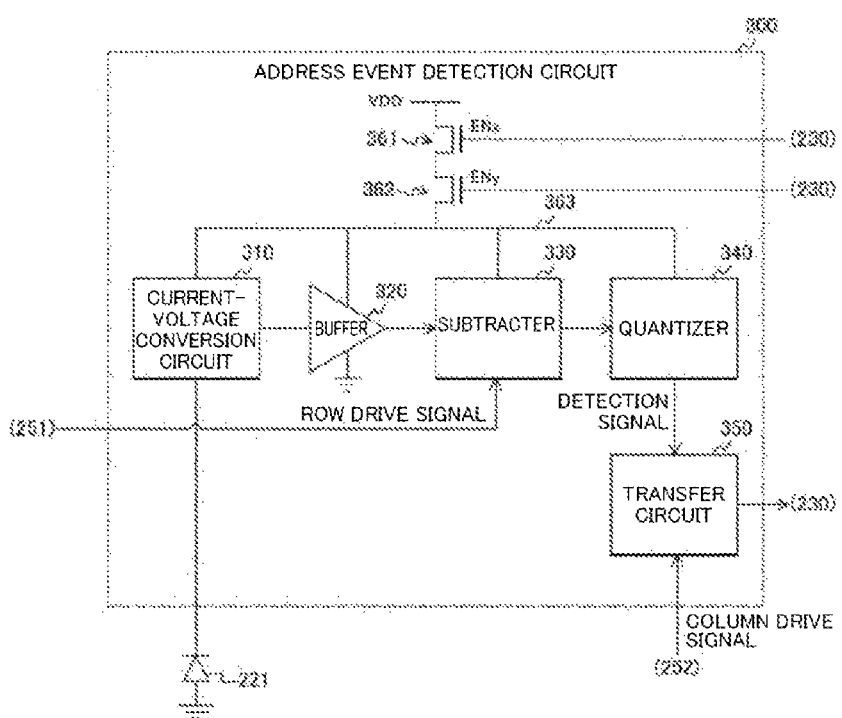
FIG. 6 is a block diagram illustrating a configuration example of an address event detection circuit.

FIG. 6 is a block diagram illustrating a configuration example of each address event detection circuit 300. The address event detection circuit 300 in FIG. 6 includes a current-voltage conversion circuit 310, a buffer 320, a subtracter 430, a quantizer 340, a transfer circuit 350, and N-type transistors 361 and 362.

The current-voltage conversion circuit 310 is configured to convert a current signal from a corresponding photodiode 221 into a voltage signal. Also, the current-voltage conversion circuit 310 supplies the voltage signal to the buffer 320.

The buffer 320 is configured to output the input voltage signal to the subtracter 430. It is possible to increase power to drive the circuits in the subsequent stage by using the buffer 320. Also, it is possible to secure isolation of noise accompanying a switching operation in the subsequent stage by the buffer 320.

The subtracter 430 is configured to obtain the amount of change in correction signal by executing subtraction processing. The subtracter 430 supplies the amount of change as a differential signal to the quantizer 340 in the subsequent stage.

The quantizer 340 is configured to compare the differential signal with a predetermined threshold value and converts an analog differential signal into a digital detection signal. The processing corresponds to quantization processing. The quantizer 340 compares the differential signal with a first threshold value and a second threshold value and supplies the comparison result as a 2-bit detection signal to the transfer circuit 350, for example. Note that the quantizer 340 is an example of a comparator.

The N-type transistors 361 and 362 can turn on and off the power to be supplied to the current-voltage conversion circuit 310, the buffer 320, the subtracter 430, the quantizer 340, and the transfer circuit 350 in accordance with an enable signal. As these N-type transistors, it is possible to use metal-oxide-semiconductor (MOS) transistors. The N-type transistors 361 and 362 are connected in series between a power source terminal and a power source line 363, and enable signals ENx and ENy supplied from the signal processing circuit 230 are input to gates thereof. The power source line 363 is connected to each of power source terminals of the current-voltage conversion circuit 310, the buffer 320, the subtracter 430, and the quantizer 340. Note that the N-type transistors 361 and 362 are examples of transistors.

Here, the enable signals ENx and ENy are signals for providing an instruction regarding whether or not to activate an output of a pixel with a pixel address (x, y). For example, both the enable signals ENx and ENy are set to a high level in a case in which the output is to be activated. Also, at least one of the enable signals ENx and ENy is set to a low level in a case in which the output is to be inactivated.

The transfer circuit 350 is configured to transfer a detection signal to the signal processing circuit 230 in accordance with a column drive signal from the column drive circuit 252.

Figure 7:
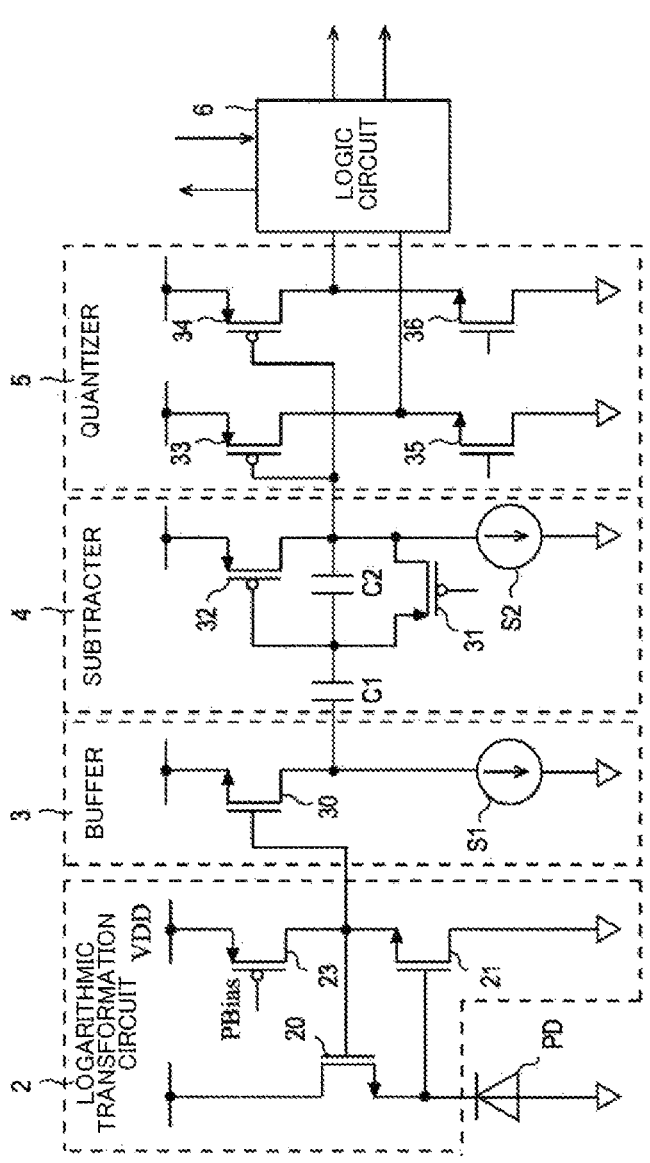
FIG. 7 is a circuit diagram illustrating an example of an address event detection circuit.

FIG. 7 is a circuit diagram illustrating an example of a general address event detection circuit. Here, the address event circuit is an example of an imaging circuit. In FIG. 7, portions corresponding to the photodiode 221, the current-voltage conversion circuit 310, the buffer 320, the subtracter 430, the quantizer 340, and the transfer circuit 350 in FIG. 6 are illustrated in detail.

The address event detection circuit in FIG. 7 includes a photodiode PD, a current-voltage conversion circuit 2, a buffer 3, a subtracter 4, a quantizer 5, and a logic circuit 6.

An anode of the photodiode PD is connected to a ground. As the ground, it is possible to use a reference potential of the circuit or a reference potential of the substrate, for example. However, the type of the reference potential used as the ground is not limited.

The current-voltage conversion circuit 2 in FIG. 7 is a detection circuit that performs general logarithm output. The current-voltage conversion circuit 2 includes a transistor 20, a transistor 21, and a transistor 23. As the transistor 20 and the transistor 21, it is possible to use NMOS transistors, for example. Also, as the transistor 23, it is possible to use a PMOS transistor, for example. A bias voltage PBias is applied to a gate terminal of the transistor 23. It is possible to use the transistor 23 as a current source transistor in accordance with the value of the bias voltage PBias.

A source of the transistor 20 is connected to a cathode of the photodiode PD. A drain of the transistor 20 is connected to a power source potential. A gate of the transistor 20 is connected to a source of the transistor 21. Also, a source of the transistor 23 is connected to a power source potential VDD. Additionally, a drain of the transistor 23 is connected to the gate of the transistor 20 and the source of the transistor 21. Also, a gate of the transistor 21 is connected to the source of the transistor 20 and the cathode of the photodiode PD. A drain of the transistor 21 is connected to the ground.

The current-voltage conversion circuit 2 converts a current flowing through the photodiode PD into a voltage value of a logarithmic output. Although the current-voltage conversion circuit 2 in FIG. 7 is a source-grounded-type logarithmic transformation circuit, this configuration is just an example. Therefore, a circuit with another configuration for converting a current into a voltage may be used. For example, a diode type circuit, a gate-grounded-type circuit, or a gain-boosted-type (multi-stage-type) logarithmic transformation circuit may be used as the current-voltage conversion circuit 2.

The buffer 3 includes a transistor 30 and a current source S1. As the transistor 30, it is possible to use an NMOS transistor, for example. As the current source S1, it is possible to use a PMOS transistor, for example. A source of the transistor 30 is connected to a power source potential. Also, a gate of the transistor 30 is connected to the current-voltage conversion circuit 2 (a node between the drain of the transistor 23 and the source of the transistor 21 in the case of the example in FIG. 7). The current source S1 is connected between a drain of the transistor 30 and the ground.

The buffer 3 is a source follower circuit that performs impedance conversion. It is possible to maintain a high input impedance and a low output impedance regardless of amplification of the voltage signal output from the current-voltage conversion circuit 2 by using the source follower circuit.

The subtracter 4 includes a capacitor C1, a capacitor C2, a transistor 31, a transistor 32, and a current source S2. As the transistor 31 and the transistor 32, it is possible to use PMOS transistors, for example. As the current source S2, it is possible to use an NMOS transistor, for example.

A source of the transistor 32 is connected to a power source potential. The current source S2 is connected between a drain of the transistor 32 and the ground. Also, the capacitor C1 and the capacitor C2 are connected in series between a node that couples the drain of the transistor 32 to the current source S2 and a node that couples the drain of the transistor 30 to the current source S1. Both the gate of the transistor 32 and the source of the transistor 31 are connected to the node that couples the capacitor C1 to the capacitor C2. The drain of the transistor 31 is connected to the node that couples the drain of the transistor 32 to the current source S2.

The transistor 32 and the current source S2 form an inverter with the gate of the transistor 32 used as an input side and with the node that couples the drain of the transistor 32 to the current source S2 used as an output side. The inverter is configured to invert an input voltage and output the inverted input voltage. The capacitor C2 is connected in parallel to the inverter. A gate voltage of the transistor 31 is controlled by a row drive signal. Therefore, ON/OFF between the source and the drain of the transistor 31 is performed in accordance with the row drive signal.

If a voltage signal $V_{init}$ is input to the side of the buffer 3 (input side) of the capacitor C1 when a conduction state is established between the source and the drain of the transistor 31, then the opposite side of the capacitor C1 serves as a virtual ground terminal. On the assumption that the potential of the virtual ground terminal is zero and the electrostatic capacity of the capacitor C1 is c1, the potential $Q_{init}$ accumulated in the capacitor C1 is represented by Equation (1) below.

[Math. 1]

$$Q_{init} = C1 \times V_{init} \tag{1}$$

On the other hand, since both ends of the capacitor C2 are short-circuited at this time, the accumulated charge in the capacitor C2 is substantially zero.

Next, operations when a non-conductive state is established between the source and the drain of the transistor 31 will be described. In this case, a case in which the voltage on the side of the buffer 3 (input side) of the capacitor C1 changes to $V_{after}$ will be discussed. In this case, the charge $Q_{after}$ accumulated in the capacitor C1 is as represented by Equation (2) below.

[Math. 2]

$$Q_{after} = c1 \times V_{after} \tag{2}$$

On the other hand, on the assumption that the output voltage is $V_{out}$ and the electrostatic capacity of the capacitor C2 is c2, the charge Q2 accumulated in the capacitor C2 at this time is as represented by Equation (3) below.

[Math. 3]

$$Q2 = -c2 \times V_{out} \tag{3}$$

Since the total amount of charge in the capacitor C1 and the capacitor C2 does not change regardless of the conductive state between the source and the drain of the transistor 31, Equation (4) below is established.

[Math. 4]

$$Q_{init} = Q_{after} + Q2 \tag{4}$$

If Equations (1) to (3) are substituted into Equation (4), Equation (5) below can be obtained.

[Math. 5]

$$V_{out} = -\frac{c1}{c2} \times (V_{after} - V_{init}) \tag{5}$$

Equation (5) indicates a subtraction operation of a voltage signal. A gain of the subtraction operation is c1/c2. In order to maximize the gain, it is possible to employ a design to obtain a large c1 value and a small c2 value. However, if the c2 value is set to be excessively small, kTC noise increases, which may affect properties. It is thus necessary to employ a design in consideration of trade-off between the gain and the noise. Note that since the address event detection circuit including the subtracter 4 is mounted for each pixel, there is a restriction in terms of areas of the capacitor C1 and the capacitor C2.

The quantizer 5 includes transistors 33 to 36. As the transistor 33 and the transistor 34, it is possible to use PMOS transistors, for example. Also, as the transistor 35 and the transistor 36, it is possible to use NMOS transistors, for example.

A source of the transistor 33 is connected to a power source potential. Also, a drain of the transistor 33 is connected to a source of the transistor 35. A drain of the transistor 35 is connected to the ground. A source of the transistor 34 is connected to a power source potential. Also, a drain of the transistor 34 is connected to a source of the transistor 36. A drain of the transistor 36 is connected to the ground. The quantizer 5 is connected to a node (subtracter 4) between the drain of the transistor 32 and the current source S2 via an input terminal. Also, the input terminal of the quantizer 5 is connected to a gate of the transistor 33 and a gate of the transistor 34.

A bias voltage Vbon is applied to a gate of the transistor 35. On the other hand, a bias voltage Vboff is applied to a gate of the transistor 36. Here, the bias voltage Vbon corresponds to the first threshold value, and the bias voltage Vboff corresponds to the second threshold value. Also, one of output terminals of the quantizer 5 is connected to a node that couples the drain of the transistor 33 to the source of the transistor 35. The voltage of the output terminal corresponds to an ON event detection signal VCH. The other output terminal of the quantizer 5 is connected to a node that couples the drain of the transistor 34 to the source of the transistor 36. The voltage of the output terminal corresponds to an OFF event detection signal VCL.

In other words, the quantizer 5 is configured to output the ON event detection signal VCH in a high level in a case in which a differential signal exceeds the first threshold value and output the OFF event detection signal VCL in a low level in a case in which the differential signal falls below the second threshold value.

The logic circuit 6 corresponds to the aforementioned signal processing circuit 230. In other words, the logic circuit 6 can perform various kinds of signal processing on the basis of the ON event detection signal VCH and the OFF event detection signal VCL input from the quantizer 5. The logic circuit 6 may be connected not only to the address event detection circuit (pixel) illustrated in FIG. 7 but also other address event detection circuits. The logic circuit 6 can thus align the detection signals as pixel signals in a two-dimensional grid shape and acquire image data. In addition, the logic circuit 6 can execute signal processing such as image recognition processing on the image data.

The address event detection circuit illustrated in FIG. 7 is adapted to perform logarithmic output. However, an address event detection circuit capable of performing linear output in addition to logarithmic output has also been developed in recent years. However, the circuit scale increases in order to provide a function for switching between the logarithmic output and the linear output, and it is thus difficult to achieve power saving and size reduction.

Thus, the present disclosure provides an imaging circuit and an imaging device capable of achieving switching between logarithmic output and a linear output while a circuit scale is reduced.

Figure 8:
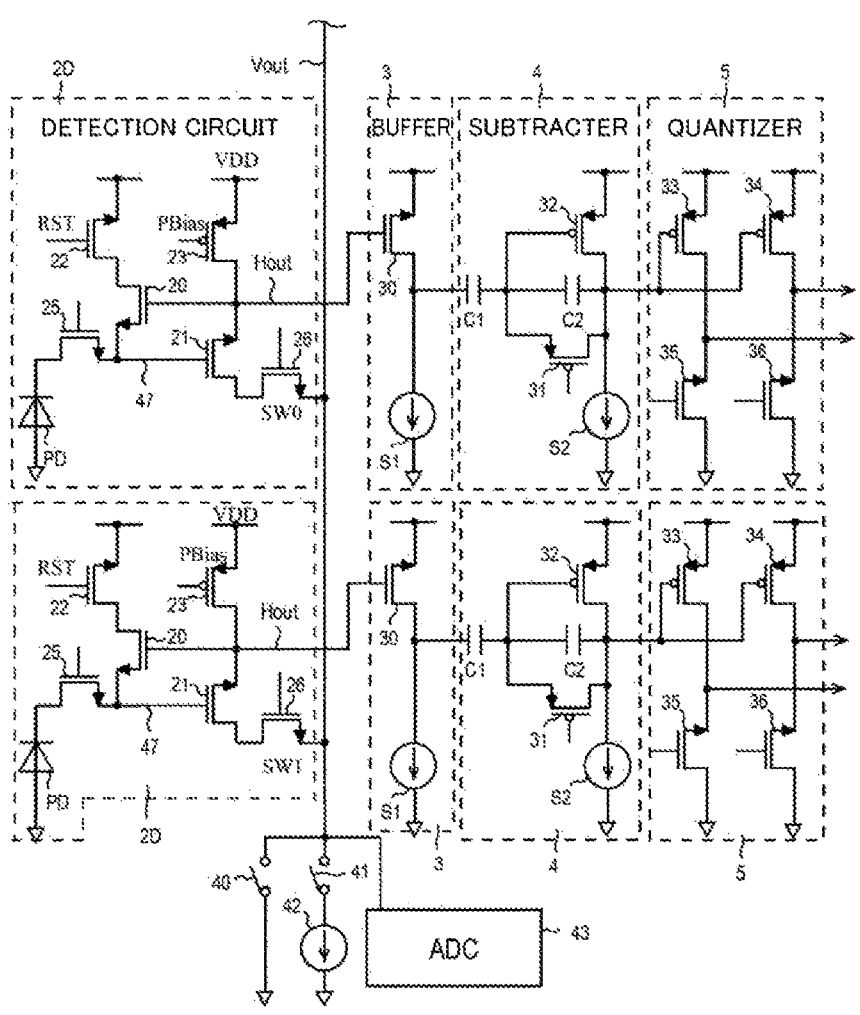
FIG. 8 is a circuit diagram illustrating an example of an imaging circuit according to the present disclosure.

The circuit diagram in FIG. 8 illustrates an example of a circuit capable of achieving switching between logarithmic output and linear output. FIG. 8 includes the address event detection circuits for two pixels. However, the number of pixels included in the imaging device according to the present disclosure may be larger than this. Each address event detection circuit includes a detection circuit 2D, a buffer 3, a subtracter 4, and a quantizer 5. Among these, configurations of the buffer 3, the subtracter 4, and the quantizer 5 in FIG. 8 are similar to those in the address event detection circuit in FIG. 7. A logic circuit 6 may be connected to the stage subsequent to the quantizer 5 although not illustrated.

The detection circuit 2D includes a photodiode PD, a transistor 20, a transistor 21, a transistor 22, a transistor 23, a transistor 25, and a transistor 26. For example, it is possible to use NMOS transistors as the transistor 20, the transistor 21, the transistor 22, the transistor 25, and the transistor 26. For example, it is possible to use a PMOS transistor as the transistor 23.

An anode of the photodiode PD is connected to a ground. As the ground, it is possible to use a reference potential of the circuit or a reference potential of the substrate, for example. However, the type of the reference potential used as the ground is not limited.

A cathode of the photodiode PD is connected to a drain of the transistor 25. On the other hand, a source of the transistor 25 is connected to a gate of the transistor 21. At least a part of electrical connection between the source of the transistor 25 and the gate of the transistor 21 may be formed by a floating diffusion layer (FD) 47. Also, a source of the transistor 20 is connected to the source of the transistor 25 and the gate of the transistor 21. A drain of the transistor 20 is connected to a drain of the transistor 22. A source of the transistor 22 is connected to a power source potential. A bias voltage RST is applied to a gate of the transistor 22. The bias voltage RST is controlled in accordance with setting of the address event detection circuit.

A gate of the transistor 20 is connected to a node that couples the source of the transistor 21 to the drain of the transistor 23. The node that couples the source of the transistor 21 to the drain of the transistor 23 is connected to an input side (the gate of the transistor 30) of the buffer 3 via a signal line Hout. Here, the signal line Hout corresponds to a first output terminal of the detection circuit 2D. A source of the transistor 23 is connected to a power source potential VDD. On the other hand, a bias voltage PBias is applied to the gate of the transistor 23. It is possible to use the transistor 23 as a current source transistor and to establish a non-conductive state between the source and the drain of the transistor 23 in accordance with the bias voltage PBias.

A drain of the transistor 21 is connected to a drain of the transistor 26. The bias voltage to be applied to a gate of the transistor 26 can be controlled. A source of the transistor 26 is connected to a signal line Vout. The source of the transistor 26 corresponds to a second output terminal of the detection circuit 2D. The signal line Vout is an example of a vertical signal line. As illustrated in FIG. 8, the second output terminals of the plurality of detection circuits 2D may be connected to the signal line Vout. Note that the signal line Vout may be a signal line provided separately from a signal line for controlling a gate voltage of the transistor 31.

The signal line Vout is connected to the analog-digital converter 43. Also, the signal line Vout is connected to the ground via a switch 40. Moreover, a switch 41 and a current source 42 are connected in series between the signal line Vout and the ground. As the switch 40, the switch 41, and the current source 42, it is possible to use field effect transistors (FETs), for example.

In this manner, the detection circuit 2D corresponds to a circuit obtained by adding the transistor 22, the transistor 25, and the transistor 26 to the current-voltage conversion circuit 2 in FIG. 7. Among these, the transistor 22 and the transistor 26 correspond to transistors added to realize switching between the logarithmic output and the linear output. On the other hand, the transistor 25 is an optional switch for correlated double sampling (CDS). As will be described later, a circuit with a configuration in which the transistor 25 is omitted may be used.

The transistor 21 in FIG. 8 corresponds to an amplification transistor. It is possible to recognize that in the circuit in FIG. 8, a source and a drain of the amplification transistor are connected to different signal processing circuits. In the case of the circuit in FIG. 8, for example, the source side of the amplification transistor is connected to the logic circuit 6 (DVS circuit), and the drain side of the amplification transistor is connected to the analog-digital converter 43. However, the types of the signal processing circuits to which the source side/drain side of the amplification transistor are connected may be different from those in the example in FIG. 8.

Also, the type of the analog-digital converter 43 that is a connection destination of the signal line Vout may not be limited, in particular. For example, the analog-digital converter 43 may be a column ADC. In this case, one or more column ADCs are prepared for one column or a plurality of columns. A column ADC may be shared by a plurality of columns. Also, the analog-digital converter 43 may be a region ADC or an ADC prepared for each pixel. In addition, a location where the analog-digital converter 43 is mounted is not limited, in particular. For example, the analog-digital converter 43 may be mounted on a chip that is different from that of the photodiode PD.

Hereinafter, operations of the circuit in FIG. 8 will be described with reference to the table in FIG. 9. In the circuit in FIG. 8, it is possible to switch the logarithmic output or the linear output for each group (a row or a column) of the detection circuits 2D connected to the same signal line Vout.

First, setting in a case in which the logarithmic output is performed will be described. In this case, the bias voltage RST of the gate of the transistor 22 is set to a power source potential. Also, the bias voltage PBias of the gate of the transistor 23 is set to a voltage for causing the transistor 23 to operate as a current source. Moreover, the bias voltage of the gate of the transistor 26 is set to a voltage for establishing conduction between the source and the drain of the transistor 26. The switch 40 is set to ON, and the switch 41 is set to OFF. Note that ON setting is performed between the source and the drain of the transistor 25 during a period of time when detection based on the logarithmic output is performed. Therefore, the signal line Vout is grounded in the case where the logarithmic output is performed. Also, in a case in which the transistor 25 is turned on, a photocurrent of the photodiode PD is converted into a voltage signal and is then output to a circuit (buffer 3) in the subsequent stage via the first output terminal of the detection circuit 2D (signal line Hout).

Next, setting in a case in which the linear output is performed will be described.

In this case, a pulse-shaped voltage signal is applied to the bias voltage RST of the gate of the transistor 22. Also, the bias voltage PBias of the gate of the transistor 23 is set to the ground potential. Moreover, the bias voltage of the gate of the transistor 26 is set to a voltage for establishing conduction between the source and the drain of the transistor 26. The switch 40 is set to OFF, and the switch 41 is set to ON. Note that ON is set between the source and the drain of the transistor 25 during a period when detection based on the linear output is performed and a period when reset processing is performed. Therefore, a current is supplied from the current source 42 to the signal line Vout in the case in which the linear output is performed. Then, in a case in which the transistor 25 is turned on, the photocurrent of the photodiode PD is converted into a voltage signal and is then output to the signal line Vout via the second output terminal of the detection circuit 2D. The analog-digital converter 43 can convert the voltage signal to a digital signal.

Note that a circuit obtained by inverting polarities of the circuit illustrated in FIG. 8 may be used. In this case, a cathode is connected to a reference potential instead of the anode of the photodiode PD. Also, it is only necessary to replace the PMOS transistor with an NMOS transistor and to replace the NMOS transistor with a PMOS transistor in FIG. 8. In other words, it is possible to invert the polarities of the circuit by inverting the connection relationship of the terminals of the photoelectric conversion element and conductive types of the transistors. Similarly, it is possible to invert the polarities of the plurality of circuits, which will be described below. Also, both the ground and the power source potential are examples of the reference potential, and it is possible to use arbitrary potentials in accordance with polarities.

The circuit illustrated in FIG. 8 is just an example of the circuit in which the logarithmic output and the linear output can be switched. Therefore, the logarithmic output and the linear output may be switched using a circuit with a configuration different from this.

The imaging circuit according to the present disclosure may include a photoelectric conversion element, a first transistor, a second transistor, a third transistor, and a fourth transistor. The photoelectric conversion element converts incident light into a photocurrent. The first transistor converts the photocurrent into a voltage signal. The second transistor amplifies the voltage signal. The third transistor controls a current to be supplied to the first transistor. The fourth transistor is connected to the second transistor. The aforementioned transistor 20 is an example of the first transistor. The transistor 21 is an example of the second transistor. The transistor (for example, the transistor 22) with the gate to which the bias voltage RST is applied is an example of the third transistor. The transistor 26 is an example of the fourth transistor. The photodiode PD is an example of the photoelectric conversion element.

Also, the imaging circuit according to the present disclosure may further include a fifth transistor that is connected between a first node that couples a control electrode of the first transistor to a first terminal of the second transistor and a first reference potential. Here, a gate of the MOS transistor is an example of the control electrode of the transistor. A source of the MOS transistor is an example of the first terminal of the transistor. The power source potential VDD is an example of the first reference potential. The transistor 23 is an example of the fifth transistor. However, in a case in which a circuit with different polarities is mounted, the correspondence between the first terminal and the first reference potential may be different from that described above.

Moreover, the imaging circuit according to the present disclosure may further include a sixth transistor that is connected between the photoelectric conversion element and a second node that couples the first terminal of the first transistor to a control electrode of the second transistor. The transistor 25 is an example of the sixth transistor.

Moreover, a buffer, a subtracter, and a quantizer may be connected to a stage subsequent to the first node in the imaging circuit according to the present disclosure. The node that couples the transistor 23 to the transistor 21 is an example of the first node.

The imaging circuit according to the present disclosure may further include a control unit. The control unit is configured to be able to achieve switching between a first mode and a second mode. In the first mode, the third transistor and the fourth transistor can be turned on, and the fifth transistor can be used as a current source. In the second mode, a pulse voltage can be applied to a control electrode of the third transistor, the fourth transistor can be turned on, and the fifth transistor can be turned off.

The imaging device according to the present disclosure may include an analog-digital converter and a plurality of imaging circuits. The first terminal of the fourth transistor in each imaging element may be connected to the analog-digital converter via a signal line. Also, the imaging device according to the present disclosure may further include a third switch, a fourth switch, and a current source. The third switch is connected between the signal line and the second reference potential. The fourth switch and the current source are connected in series between the signal line and the second reference potential.

Figure 10:
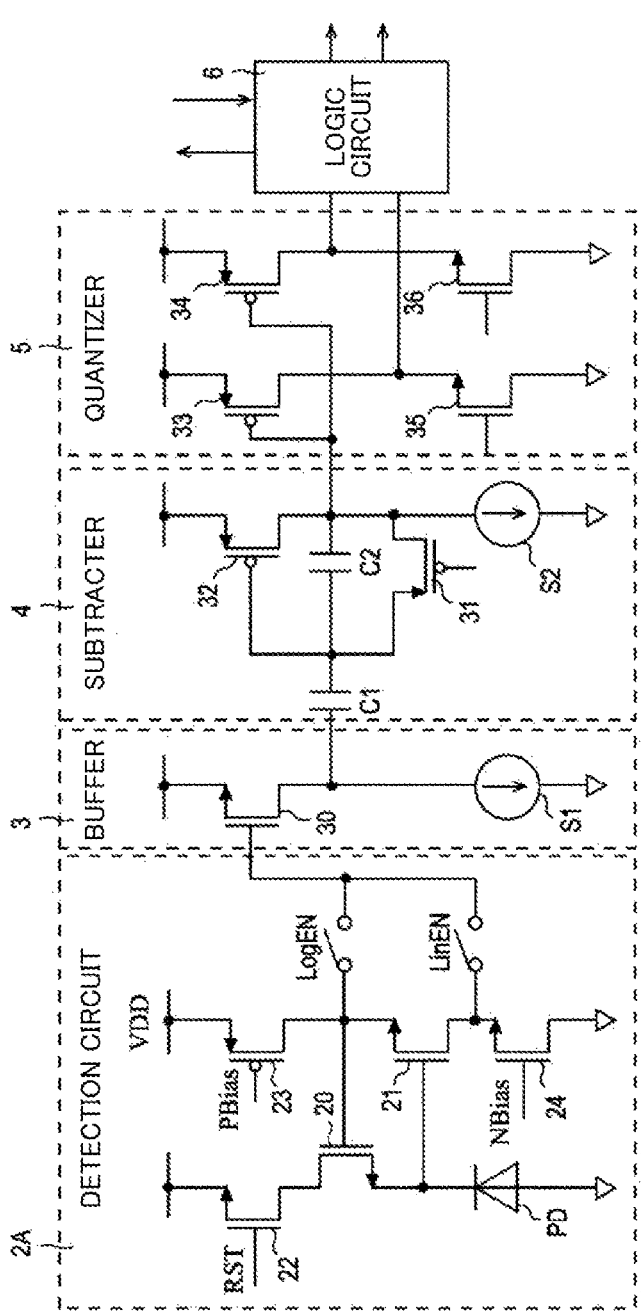
FIG. 10 is a circuit diagram illustrating an example of an imaging circuit according to a first modification example.

The circuit diagram in FIG. 10 illustrates an example of an imaging circuit according to a first modification example. An address event circuit in FIG. 10 includes a detection circuit 2A, a buffer 3, a subtracter 4, a quantizer 5, and a logic circuit 6. Configurations of the buffer 3, the subtracter 4, the quantizer 5, and the logic circuit 6 are similar to those in the address event circuit in FIG. 7. The detection circuit 2A includes a photodiode PD, a transistor 20, a transistor 21, a transistor 22, a transistor 23, a transistor 24, a switch LogEN, and a switch LinEN. As the transistor 20, the transistor 21, the transistor 22, and the transistor 24, it is possible to use NMOS transistors, for example. As the transistor 23, it is possible to use a PMOS transistor, for example.

An anode of the photodiode PD is connected to a ground. As the ground, it is possible to use a reference potential of the circuit or a reference potential of the substrate, for example. However, the type of the reference potential used as the ground is not limited.

A cathode of the photodiode PD is connected to a source of the transistor 20 and a gate of the transistor 21. A drain of the transistor 20 is connected to a drain of the transistor 22. A source of the transistor 22 is connected to a power source potential. Also, a bias voltage RST is applied to a gate of the transistor 22. On the other hand, a gate of the transistor 20 is connected to a source of the transistor 21, a drain of the transistor 23, and the switch LogEN. A source of the transistor 23 is connected to a power source potential VDD. A bias voltage PBias is applied to a gate of the transistor 23.

A drain of the transistor 21 is connected to the switch LinEN and a source of the transistor 24. A bias voltage NBias is applied to a gate of the transistor 24. Also, a drain of the transistor 24 is connected to the ground. The switch LogEN is connected between a node that couples the drain of the transistor 23 to a source of the transistor 21 and an output terminal of the detection circuit 2A. On the other hand, the switch LinEN is connected between a node that couples the drain of the transistor 21 to a source of the transistor 24 and the output terminal of the detection circuit 2A. The output terminal of the detection circuit 2A is connected to an input side (a gate of a transistor 30) of the buffer 3.

Hereinafter, operations of the circuit in FIG. 10 will be described with reference to the table in FIG. 11.

First, setting in a case in which the logarithmic output is performed will be described. In this case, the bias voltage RST of the gate of the transistor 22 is set to a power source potential. Also, the bias voltage PBias of the gate of the transistor 23 is set to a voltage for causing the transistor 23 to operate as a current source. A bias voltage of the gate of the transistor 24 is set to a power source potential. The switch LogEN is set to ON, and the switch LinEN is set to OFF. In a case in which logarithmic output is performed, a photocurrent of the photodiode PD is converted into a voltage signal and is then output to a circuit (buffer 3) in the subsequent stage via the output terminal of the detection circuit 2A.

Next, setting in a case in which the linear output is performed will be described. In this case, a pulse-shaped voltage signal is applied to the bias voltage RST of the gate of the transistor 22. Also, the bias voltage PBias of the gate of the transistor 23 is set to the ground potential. Moreover, a bias voltage of the gate of the transistor 24 is set to a voltage for causing the transistor 24 to operate as a current source. The switch LogEN is set to OFF, and the switch LinEN is set to ON. The photocurrent of the photodiode PD is converted into a voltage signal and is then output to the circuit (buffer 3) in the subsequent stage via the output terminal of the detection circuit 2A even in a case in which linear output is performed.

In the circuit in FIG. 10, the logic circuit 6 may be provided for each pixel or may be shared by a plurality of pixels. Also, the logic circuit 6 may be mounted on the same chip as that of the photodiode PD or may be mounted on a chip that is different from that of the photodiode PD.

In the circuit in FIG. 10, different switches are connected to the source and the drain of the amplification transistor (transistor 21). The detection signal is supplied to the logic circuit 6 (DVS circuit) or a circuit in a stage therebefore even in a case in which either the switch LinEN or the switch LogEN is turned on. Therefore, it is possible to use a circuit capable of switching the modes in accordance with the states of the switch LinEN and the switch LogEN as the logic circuit 6 in FIG. 10. For example, the logic circuit 6 can operate in the first mode corresponding to the logarithmic output when the switch LogEN is turned on. Also, the logic circuit 6 can operate in the second mode corresponding to the linear output when the switch LinEN is turned on. For example, it is possible to switch the aforementioned modes of the logic circuit 6 on the basis of the amount of light. The amount of light can be measured by a dedicated pixel or an external sensor. For example, the amount of light may be measured using a pixel with an adjusted exposure time or analog gain.

The imaging circuit according to the present disclosure may further include a first switch with a stage therebefore to which the control electrode of the first transistor and the first terminal of the second transistor are connected and a second switch with a stage therebefore to which the second terminal of the second transistor and the first terminal of the fourth transistor are connected. In this case, the fourth transistor may be connected between the second transistor and the second reference potential. The transistor 24 in FIG. 10 is an example of the fourth transistor. The switch LogEN is an example of the first switch. The switch LinEN is an example of the second switch. The ground is an example of the second reference potential. The buffer, the subtracter, and the quantizer may be connected to the stage subsequent to the first switch, and the analog-digital converter may be connected to the stage subsequent to the second switch.

Figure 12:
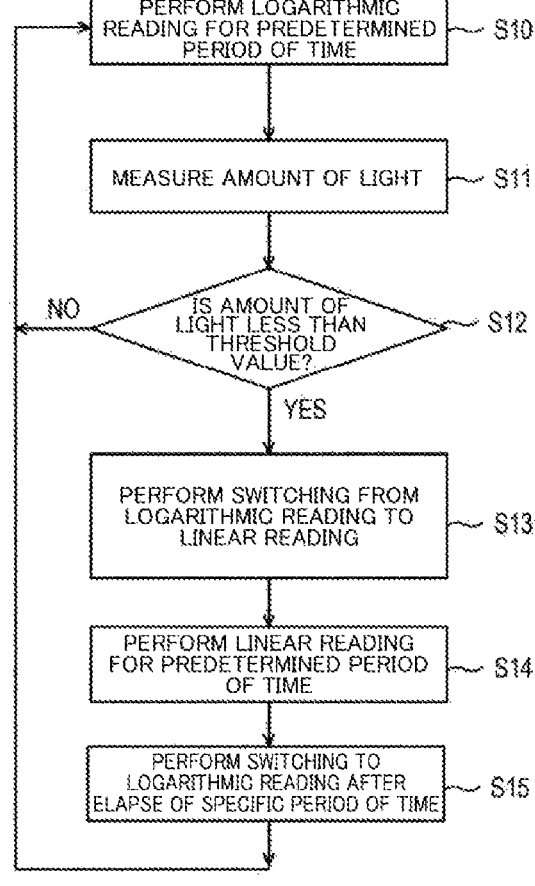
FIG. 12 is a flowchart illustrating an example of processing for switching between logarithm reading and linear reading.

FIG. 12 is a flow chart illustrating an example of processing for switching between logarithmic reading and linear reading. In the case of the circuit in FIG. 10, the first mode corresponds to the logarithmic reading, and the second mode corresponds to the linear reading. The switching of the modes may be performed for the entire pixel array or may be performed for a part of the pixel array. Hereinafter, the processing will be described with reference to the flow chart in FIG. 12.

First, the imaging circuit performs logarithmic reading for a predetermined period of time (Step S10). Next, the amount of light in an environment is measured (Step S11). Then, whether or not the measured amount of light is less than a threshold value is determined (Step S12). In a case in which the measured amount of light is less than the threshold value (YES in Step S12), the imaging circuit is switched from the logarithmic reading to the linear reading (Step S13). Next, the imaging circuit performs linear reading for a predetermined period of time (Step S14). Then, the imaging circuit is switched to the logarithmic reading after elapse of a specific period of time (Step S15). For example, it is possible to measure a time in Step S15 using a timer circuit. On the other hand, in a case in which the measured amount of light is equal to or greater than the threshold value (NO in Step S12), the imaging circuit performs logarithmic reading for a predetermined period of time (Step S10).

FIG. 12 illustrates an example of processing for switching to the linear reading when the amount of light is relatively small. However, conditions for switching the reading method may be different from this. For example, processing for switching to the linear reading when the amount of light is relatively large may be employed as in the flow chart in FIG. 13. Hereinafter, the processing will be described with reference to the flow chart in FIG. 13.

First, the imaging circuit performs logarithmic reading for a predetermined period of time (Step S20). Next, the amount of light in an environment is measured (Step S21). Then, whether or not the measured amount of light is equal to or greater than a threshold value is determined (Step S22). In a case in which the measured amount of light is equal to or greater than the threshold value (YES in Step S22), the imaging circuit is switched from the logarithmic reading to the linear reading (Step S23). Next, the imaging circuit performs linear reading for a predetermined period of time (Step S24). Then, the imaging circuit is switched to the logarithmic reading after elapse of a specific period of time (Step S25). For example, it is possible to measure a time in Step S25 using a timer circuit. On the other hand, in a case in which the measured amount of light is less than the threshold value (NO in Step S22), the imaging circuit performs logarithmic reading for a predetermined period of time (Step S20).

In this manner, the control unit may be configured to achieve switching between the first mode and the second mode in accordance with the measured amount of light.

Figure 14:
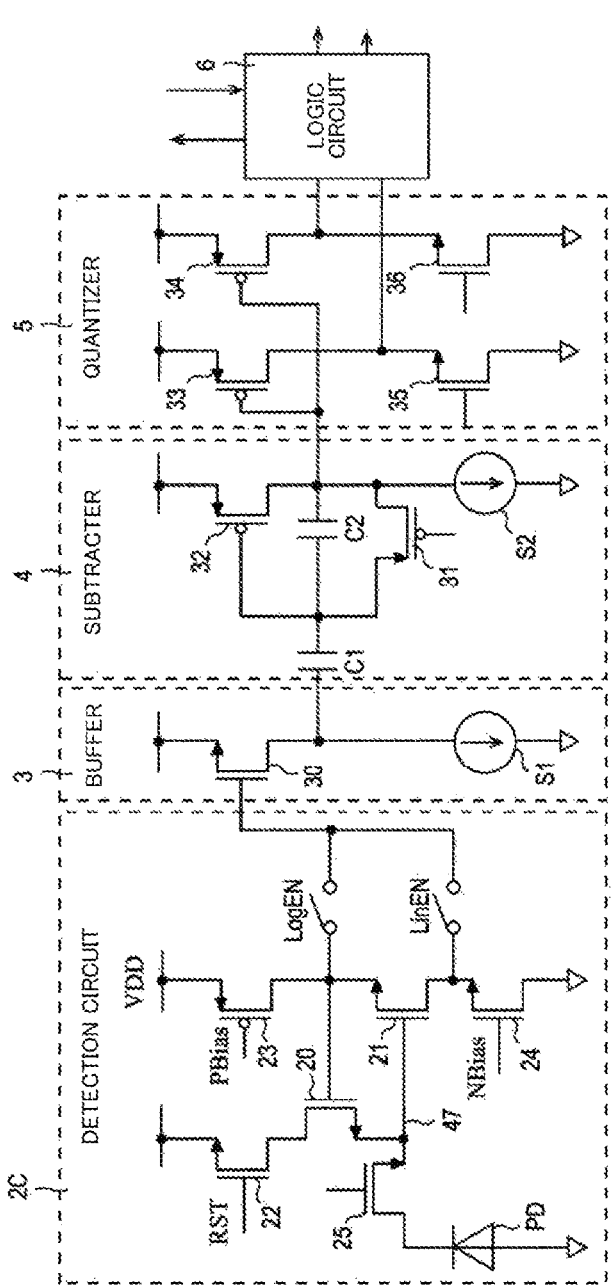
FIG. 14 is a circuit diagram illustrating an example of an imaging circuit according to a second modification example.

FIG. 14 illustrates an example of an imaging circuit according to a second modification example. An address event circuit in FIG. 14 includes a detection circuit 2C, a buffer 3, a subtracter 4, a quantizer 5, and a logic circuit 6. Configurations of the buffer 3, the subtracter 4, the quantizer 5, and the logic circuit 6 are similar to those in the address event circuit in FIG. 7. A configuration of the detection circuit 2C is similar to that of the detection circuit 2A in FIG. 10 other than that a transistor 25 is provided between a cathode of a photodiode PD and a node that couples a source of a transistor 20 to a gate of a transistor 21. In other words, a drain of the transistor 25 is connected to the cathode of the photodiode PD. Also, a source of the transistor 25 is connected to the source of the transistor 20 and the gate of the transistor 21.

It is possible to set ON between the source and the drain of the transistor 25 during a period when detection based on the logarithmic output is performed. Also, it is possible to set ON between the source and the drain of the transistor 25 during a period when detection based on the linear output is performed and a period during which reset processing is performed.

It is possible to use the logic circuit 6 in the first mode (logarithmic reading) or in the second mode (linear reading) in the circuit in FIG. 14 as well. For example, the logic circuit 6 can detect motion of an object depending on whether or not a contrast ratio of the measured amount of light exceeds a threshold value in the first mode.

Also, the logic circuit 6 can detect motion of the object depending on whether or not a difference in the measured amount of light exceeds a threshold value in the second mode. However, the logic circuit 6 may detect motion of the object depending on other criteria.

Figure 15:
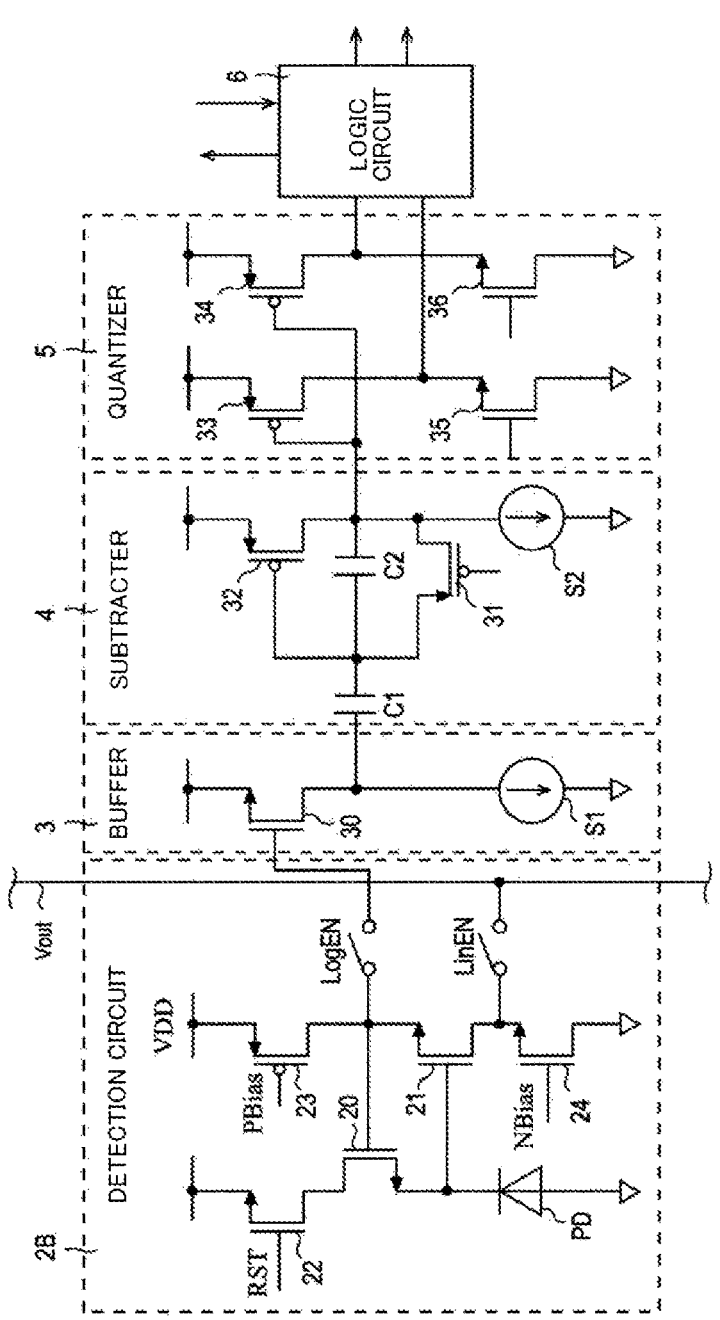
FIG. 15 is a circuit diagram illustrating an example of an imaging circuit according to a third modification example.

FIG. 15 illustrates an example of an imaging circuit according to a third modification example. An address event circuit in FIG. 15 includes a detection circuit 2B, a buffer 3, a subtracter 4, a quantizer 5, and a logic circuit 6. Configurations of the buffer 3, the subtracter 4, the quantizer 5, and the logic circuit 6 are similar to those in the address event circuit in FIG. 7. On the other hand, a configuration of the detection circuit 2B is similar to that of the detection circuit 2A in FIG. 10 other than a connection destination on an output side of a switch LinEN. In other words, the output side of the switch LinEN is connected to a signal line Vout instead of the buffer 3. In this manner, a signal of logarithmic output and a signal of linear output may be output to different circuits.

Figure 16:
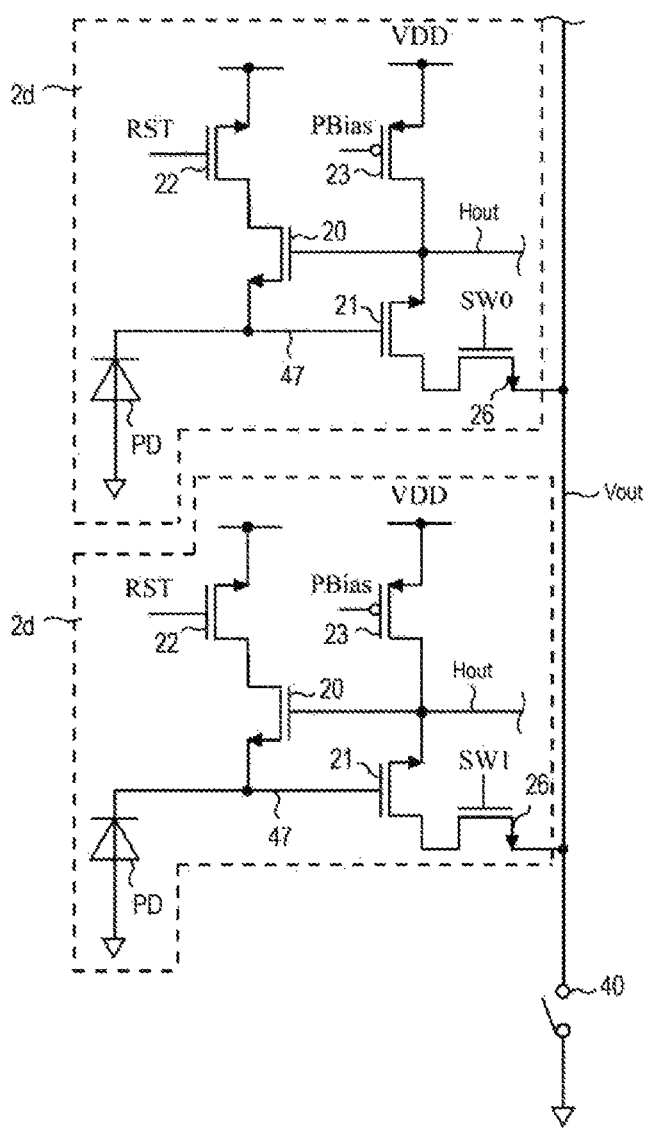
FIG. 16 is a circuit diagram illustrating an example of an imaging circuit according to a fourth modification example.

FIG. 16 illustrates an example of an imaging circuit according to a fourth modification example. In FIG. 16, a plurality of detection circuits 2d are connected to a signal line Vout. Each detection circuit 2d corresponds to the detection circuit 2D in FIG. 8 from which the transistor 25 is omitted.

In each detection circuit 2d, a drain of an amplification transistor (transistor 21) is connected to the signal line Vout via a transistor 26. Specifically, a drain of a transistor 21 is connected to a drain of the transistor 26, and a source of the transistor 26 is connected to the signal line Vout. Also, a switch 40 may be provided between the signal line Vout and the ground as illustrated in FIG. 16. Here, the switch 40 may be mounted outside a pixel array.

Figure 17:
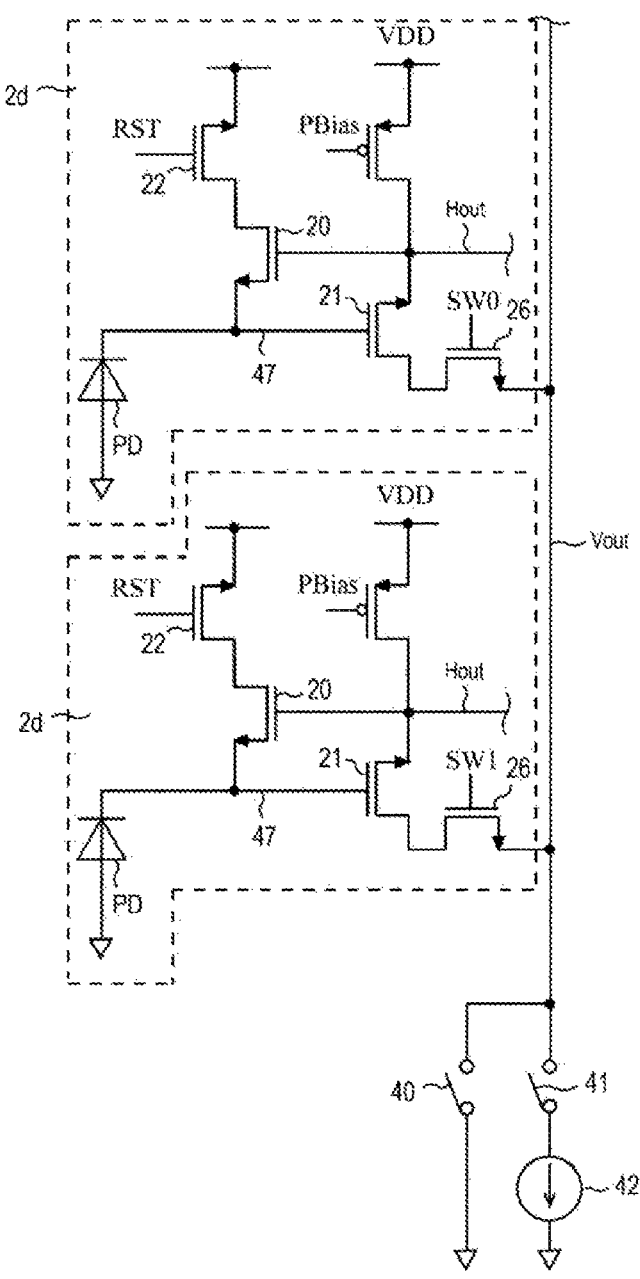
FIG. 17 is a circuit diagram illustrating an example of an imaging circuit according to a fifth modification example.

FIG. 17 illustrates an example of an imaging circuit according to a fifth modification example. The circuit in FIG. 17 corresponds to a circuit obtained by adding a switch 41 and a current source 42 to the circuit in FIG. 16. The switch 41 and the current source 42 are connected in series between a signal line Vout and the ground. The switch 41 and the current source 42 are connected in parallel when seen from a switch 40. In a case in which the switch 40 is turned off, the switch 41 is turned on, and linear output is performed by the detection circuit 2d in the configuration in FIG. 17, it is possible to read a gradation signal by the signal line Vout.

Figure 18:
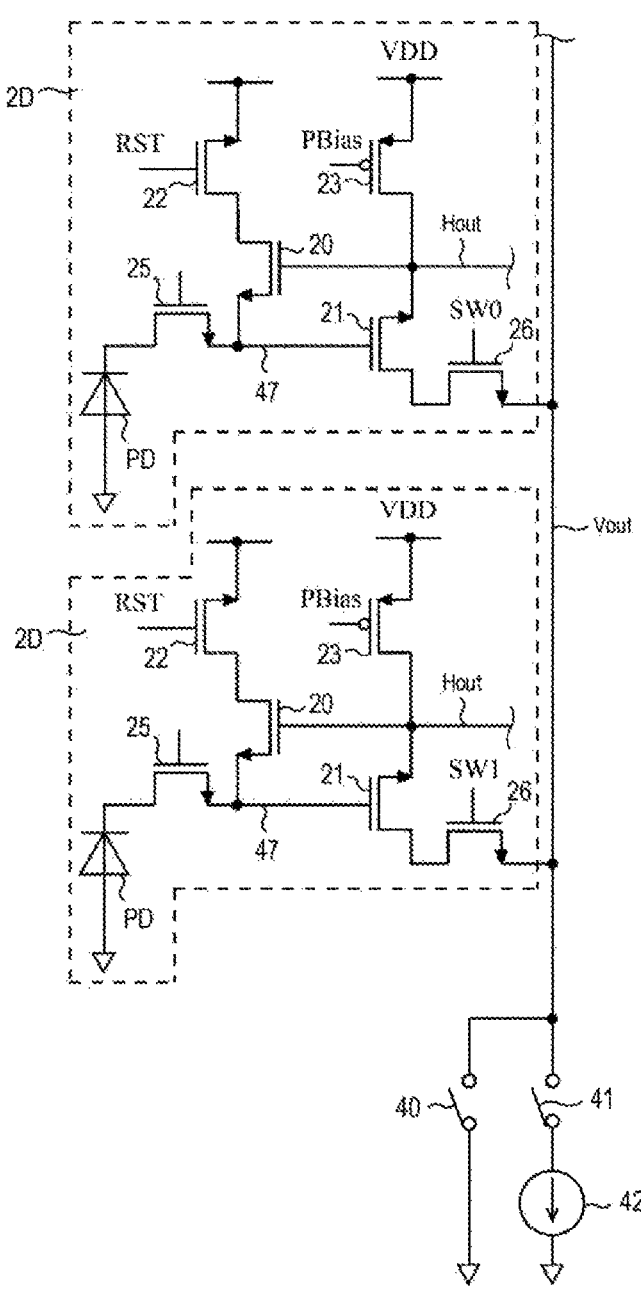
FIG. 18 is a circuit diagram illustrating an example of an imaging circuit according to a sixth modification example.

FIG. 18 illustrates an example of an imaging circuit according to a sixth modification example. The circuit in FIG. 18 corresponds to a circuit obtained by adding a transistor 25 between the cathode of the photodiode PD and the floating diffusion layer 47 in each imaging circuit in FIG. 17. In other words, a drain of the transistor 25 is connected to the cathode of the photodiode PD. On the other hand, a source of the transistor 25 is connected to the floating diffusion layer 47.

Note that in the imaging circuit according to the present disclosure, the capacity of the floating diffusion layer 47 may be variable. Also, one floating diffusion layer may be shared by a plurality of photodiodes PD. Moreover, the capacity of a conversion transistor (transistor 20) on the side opposite to the photodiode PD may be variable.

Figure 19:
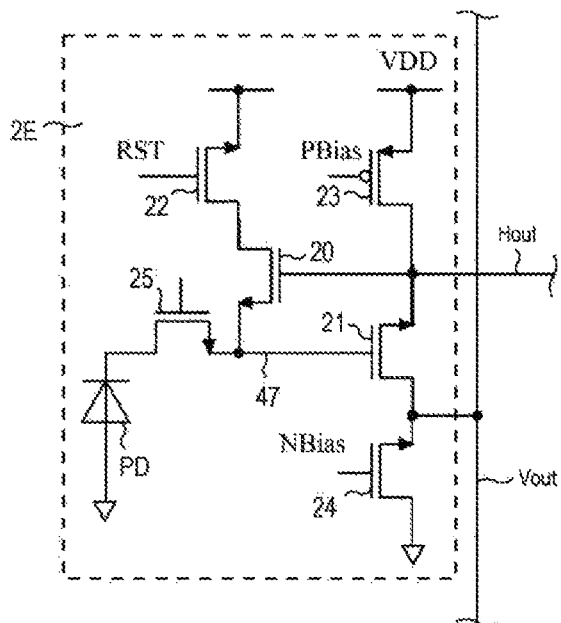
FIG. 19 is a circuit diagram illustrating an example of an imaging circuit according to a seventh modification example.

FIG. 19 illustrates an example of an imaging circuit according to a seventh modification example. A detection circuit 2E in FIG. 19 includes a photodiode PD, a transistor 20, a transistor 21, a transistor 22, a transistor 23, a transistor 24, and a transistor 25. The transistor 20, the transistor 21, the transistor 22, the transistor 24, and the transistor 25 are NMOS transistors. On the other hand, the transistor 23 is a PMOS transistor.

An anode of the photodiode PD is connected to a ground. A cathode of the photodiode PD is connected to a drain of the transistor 25. A source of the transistor 25 is connected to a source of the transistor 20 and a gate of the transistor 21. A gate of the transistor 20 is connected to a source of the transistor 21, a drain of the transistor 23, and a signal line Hout (first output terminal). A drain of the transistor 20 is connected to a drain of the transistor 22. Also, a source of the transistor 22 is connected to a power source potential. A bias voltage RST is applied to a gate of the transistor 22. A source of the transistor 23 is connected to a power source potential VDD. Also, a bias voltage PBias is applied to a gate of the transistor 23.

A drain of the transistor 21 and a source of the transistor 24 are connected to a signal line Vout via a second output terminal. A drain of the transistor 24 is connected to the ground. Also, a bias voltage NBias is applied to a gate of the transistor 24.

Operations of the detection circuit 2E in FIG. 19 is similar to those of the detection circuit 2C in FIG. 14 other than that the switch LinEN and the switch LogEN are not included.

Figure 20:
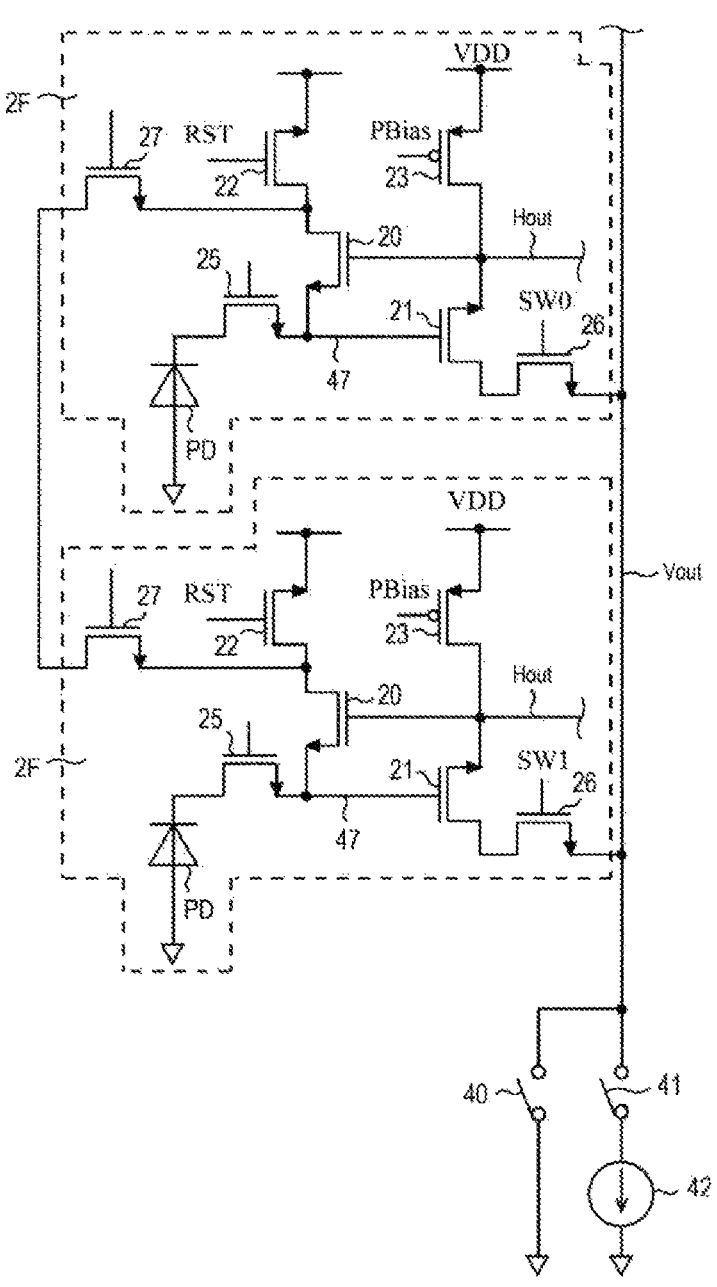
FIG. 20 is a circuit diagram illustrating an example of an imaging circuit according to an eighth modification example.

FIG. 20 illustrates an example of an imaging circuit according to an eighth modification example. A detection circuit 2F in FIG. 20 corresponds to a circuit obtained by adding a transistor 27 to the detection circuit 2D. In other words, a source of the transistor 27 is connected to a drain of a transistor 22 and a drain of a transistor 20. On the other hand, a drain of the transistor 27 is connected to drains of transistors 27 of other detection circuits 2F.

In this manner, in the imaging circuit according to the present disclosure, the node of the first transistor on the side opposite to the photodiode PD (the drain of the transistor 20) may be connected to a corresponding node of another pixel via one or more transistors. The first transistor refers to a transistor that converts a photocurrent into a voltage signal.

Figure 21:
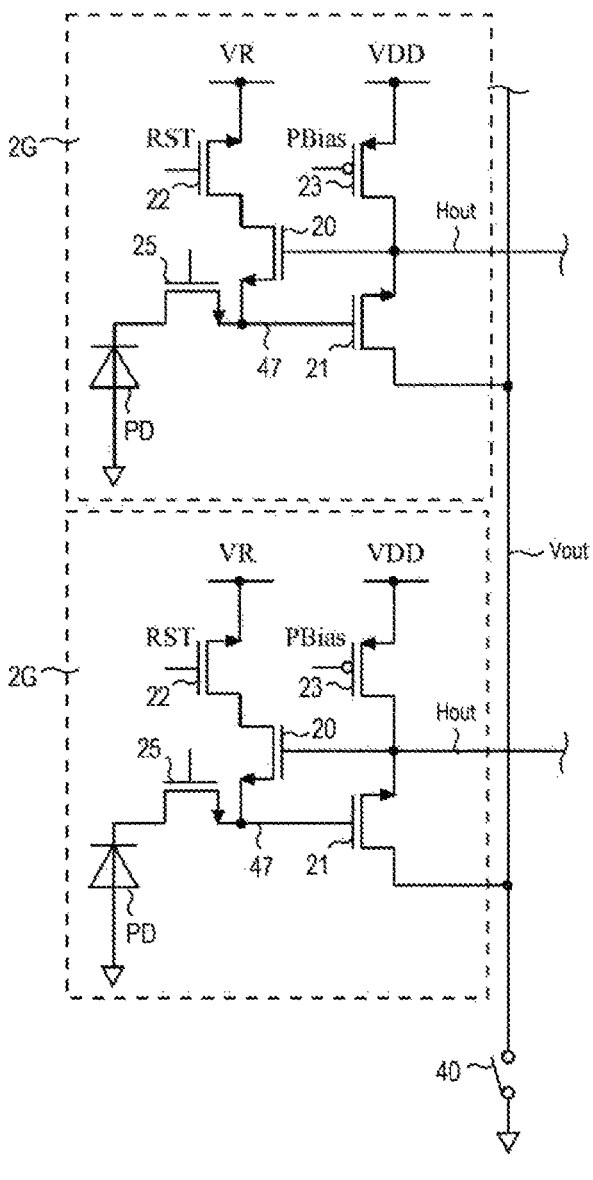
FIG. 21 is a circuit diagram illustrating an example of an imaging circuit according to a ninth modification example.

FIG. 21 illustrates an example of an imaging circuit according to a ninth modification example. In a detection circuit 2G in FIG. 21, a power source potential VR to which a source (the logarithmic transformation side) of a transistor 22 is connected and a power source potential VDD to which a source (amplifier side) of the transistor 23 is connected are different. For example, different power sources may be used as the power source potential VR and the power source potential VDD. Also, voltage division may be performed from the same power source circuit to generate different potentials. In this case, it is possible to omit switches in the detection circuit (pixel). Also, the imaging circuit may be configured such that complete transfer can be performed between a photodiode PD and a floating diffusion layer 47.

Figure 22:
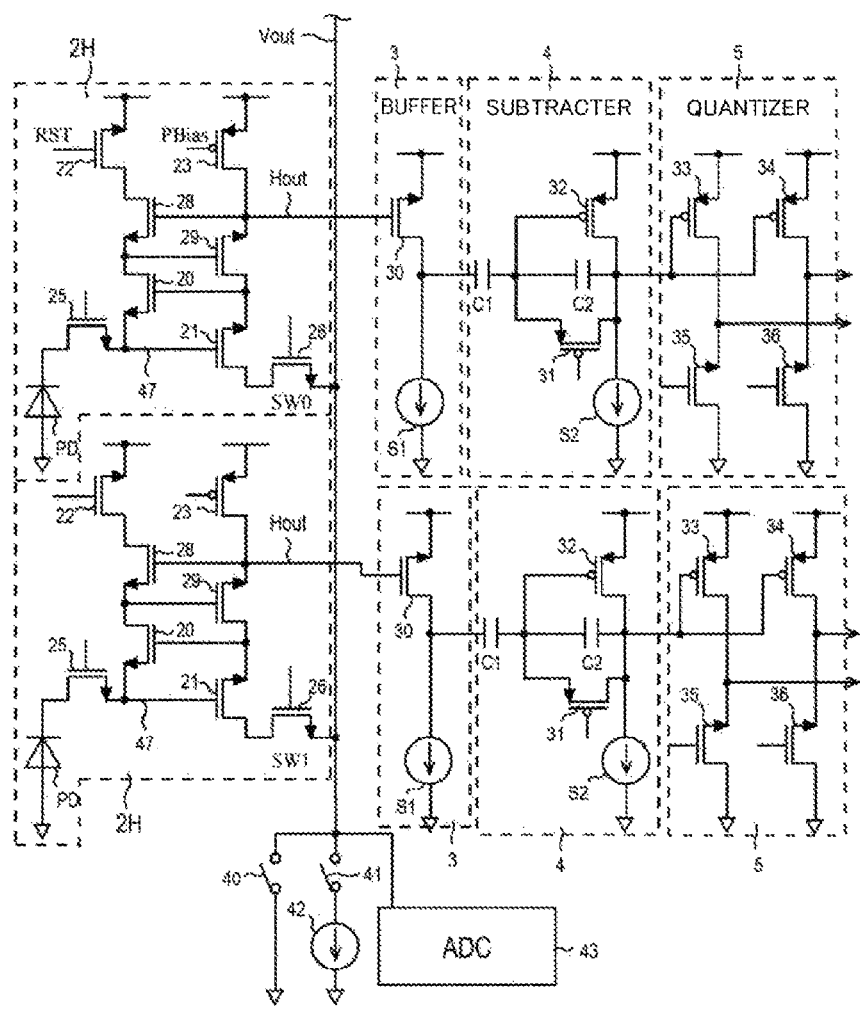
FIG. 22 is a circuit diagram illustrating an example of an imaging element according to a tenth modification example.

FIG. 22 illustrates an example of an imaging circuit according to a tenth modification example. A detection circuit 2H in FIG. 22 includes a photodiode PD, a transistor 20, a transistor 21, a transistor 22, a transistor 23, a transistor 25, a transistor 26, a transistor 28, and a transistor 29. As the transistor 20, the transistor 21, the transistor 22, the transistor 25, the transistor 26, the transistor 28, and the transistor 29, it is possible to use NMOS transistors, for example. As the transistor 23, it is possible to use a PMOS transistor, for example.

An anode of the photodiode PD is connected to a ground. On the other hand, a cathode of the photodiode PD is connected to a drain of the transistor 25. A source of the transistor 25 is connected to a gate of the transistor 21 and a source of the transistor 20. A source of the transistor 21 is connected to a drain of the transistor 29 and a gate of the transistor 20. A drain of the transistor 21 is connected to a drain of the transistor 26. The bias voltage to be applied to a gate of the transistor 26 can be controlled. A source of the transistor 26 corresponds to a second output terminal of the detection circuit 2H and is connected to a signal line Vout.

A drain of the transistor 20 is connected to a gate of the transistor 29 and a source of the transistor 28. A gate of the transistor 28 is connected to a source of the transistor 29, a drain of the transistor 23, and a signal line Hout. The signal line Hout corresponds to a first output terminal of the detection circuit and is connected to the buffer 3 (a gate of the transistor 30). A drain of the transistor 28 is connected to a drain of the transistor 22. A bias voltage RST is applied to a gate of the transistor 22. A source of the transistor 22 is connected to a power source potential. On the other hand, a bias voltage PBias is applied to a gate of the transistor 23. A source of the transistor 23 is connected to a power source potential.

The detection circuit in FIG. 22 is a gain boosting-type circuit in which two logarithmic transformation circuits are included. It is possible to enhance sensitivity of the detection circuit and to increase a gain of the current-voltage conversion by using the gain boosting-type circuit. In this manner, the configurations of the current-voltage conversion circuit that can be used in the imaging circuit according to the present disclosure are not limited. Also, current-voltage conversion circuits with different configurations may be implemented depending on pixels in the pixel array.

Figure 23:
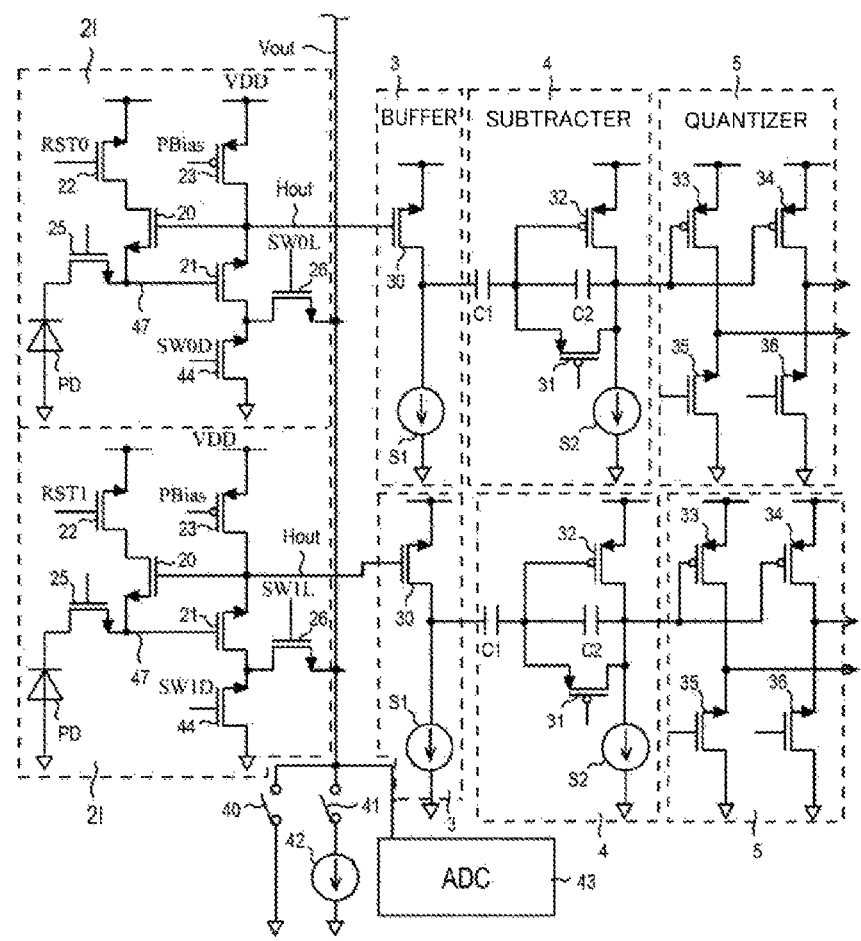
FIG. 23 is a circuit diagram illustrating an example of an imaging circuit according to an eleventh modification example.

FIG. 23 illustrates an imaging circuit according to an eleventh modification example. A detection circuit 21 in FIG. 23 includes a photodiode PD, a transistor 20, a transistor 21, a transistor 22, a transistor 23, a transistor 25, a transistor 26, and a transistor 44. As the transistor 20, the transistor 21, the transistor 22, the transistor 25, the transistor 26, and the transistor 44, it is possible to use NMOS transistors, for example. As the transistor 23, it is possible to use a PMOSNMOS transistor, for example.

An anode of the photodiode PD is connected to a ground. A cathode of the photodiode PD is connected to a drain of the transistor 25. A source of the transistor 25 is connected to a source of the transistor 20 and a gate of the transistor 21. A gate of the transistor 20 is connected to a source of the transistor 21, a drain of the transistor 23, and a signal line Hout. The signal line Hout corresponds to a first output terminal of the detection circuit 2I. A drain of the transistor 20 is connected to a drain of the transistor 22. A bias voltage RSTx (x=0, 1, 2, . . . ) is applied to a gate of a transistor 22. A source of the transistor 22 is connected to a power source potential. A bias voltage PBias is applied to a gate of the transistor 23. A source of the transistor 23 is connected to a power source potential VDD.

On the other hand, a drain of the transistor 21 is connected to a drain of a transistor 26 and a source of a transistor 44. A bias voltage SWxD (x=0, 1, 2, . . . ) is applied to a gate of the transistor 44. A drain of the transistor 44 is connected to the ground. A bias voltage SWxL (x=0, 1, 2, . . . ) is applied to a gate of the transistor 26. A source of the transistor 26 corresponds to a second output terminal of the detection circuit 21 and is connected to a signal line Vout.

Note that configurations of a buffer 3, a subtracter 4, and a quantizer 5 are similar to those in the diagrams described above. Although not illustrated, it is assumed that a logic circuit 6 is connected to the stage subsequent to the quantizer 5.

The imaging circuit according to the present disclosure may further include a sixth transistor connected between a third node that couples a second terminal of a second transistor to a second terminal of a fourth transistor and a second reference potential. A drain of the MOS transistor is an example of the second terminal of the transistor. The node that couples the transistor 21 to the transistor 26 is an example of the third node. The transistor 44 is an example of the sixth transistor. The ground is an example of the second reference potential. However, the correspondence between the second terminal of the transistor and the second reference potential may be different from that described above in accordance with polarities of the circuit.

Hereinafter, operations of the circuit in FIG. 23 will be described with reference to the table in FIG. 24.

First, setting in a case in which the logarithmic output is performed will be described. In this case, the bias voltage RSTx applied to the gate of the transistor 22 is set to a power source potential. Also, the bias voltage PBias applied to the gate of the transistor 23 is set to a voltage for causing the transistor 23 to operate as a current source. The bias voltage SWxL applied to the gate of the transistor 26 is low. In this manner, a non-conductive state is achieved between the source and the drain of the transistor 26. The bias voltage SWxD applied to the gate of the transistor 44 is high. In this manner, a conductive state is achieved between the source and the drain of the transistor 44. The switch 40 is set to OFF, and the switch 41 is set to ON. In a case in which logarithmic output is performed, a photocurrent of the photodiode PD is converted into a voltage signal and is then output to a circuit (buffer 3) in the subsequent stage via the output terminal of the detection circuit 2A.

Next, setting in a case in which the linear output is performed will be described. In this case, a pulse-shaped voltage signal is applied to the bias voltage RSTx applied to the gate of the transistor 22. Also, the bias voltage PBias applied to the gate of the transistor 23 is set to the ground potential. The bias voltage SWxL applied to the gate of the transistor 26 is high. In this manner, a conductive state is achieved between the source and the drain of the transistor 26. The bias voltage SWxD applied to the gate of the transistor 44 is low. In this manner, a non-conductive state is achieved between the source and the drain of the transistor 44. The switch 40 is set to ON, and the switch 41 is set to OFF. The photocurrent of the photodiode PD is converted into a voltage signal and is then output to the circuit (buffer 3) in the subsequent stage via the output terminal of the detection circuit 2A even in a case in which linear output is performed.

The imaging circuit according to the present disclosure may include a control unit. The control unit is configured to be able to achieve switching between a first mode and a second mode. In the first mode, the third transistor can be turned on, the fourth transistor can be turned off, the fifth transistor can be used as a current source, and the sixth transistor can be turned on. In the second mode, a pulse voltage can be applied to the control electrode of the third transistor, the fourth transistor can be turned on, the fifth transistor can be turned off, and the sixth transistor can be turned off.

Also, in the first mode, the third transistor and the fourth transistor can be turned on, the fifth transistor can be used as a current source, the first switch can be turned on, and the second switch can be turned off. In this case, in the second mode, a pulse voltage can be applied to the control electrode of the third transistor, the fourth transistor is turned on, the fifth transistor can be turned off, the first switch can be turned off, and the second switch can be turned on.

Moreover, in the first mode, the third transistor and the fourth transistor can be turned on, the fifth transistor can be used as a current source, the third switch can be turned on, and the fourth switch can be turned off. In the second mode, a pulse voltage can be applied to the control electrode of the third transistor, the fourth transistor can be turned on, the fifth transistor can be turned off, the third switch can be turned on, and the fourth switch can be turned off.

Figure 25:
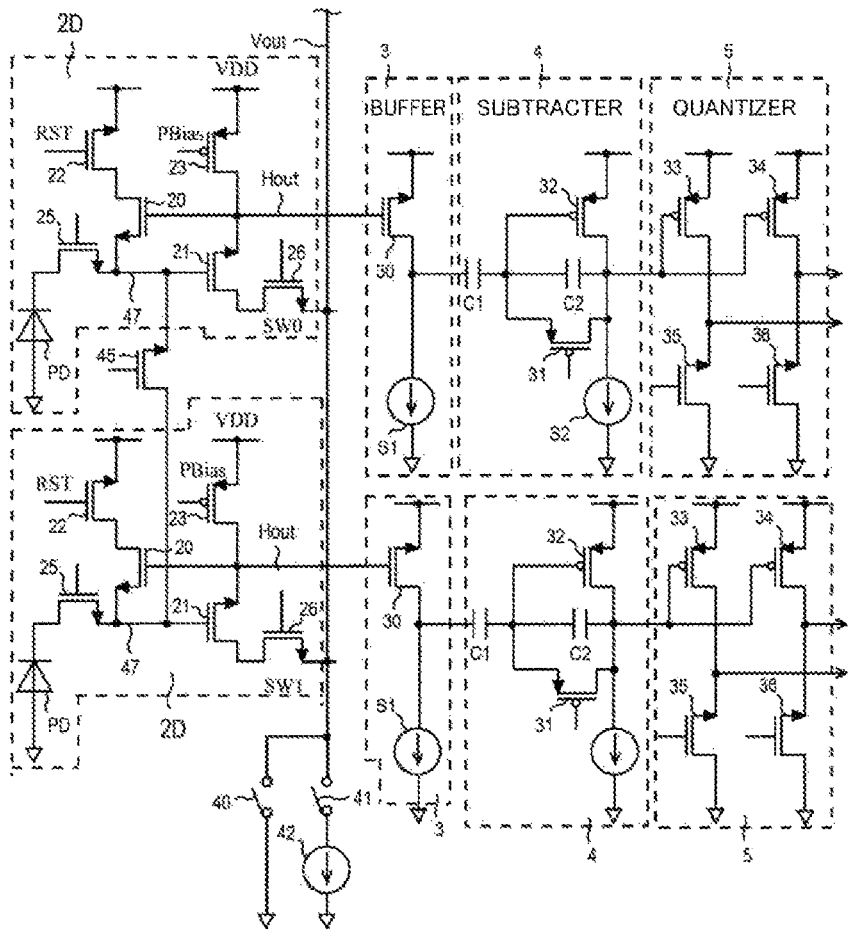
FIG. 25 is a circuit diagram illustrating an example of an imaging circuit according to a twelfth modification example.

FIG. 25 illustrates an example of an imaging circuit according to a twelfth modification example. In FIG. 25, floating diffusion layers 47 of the detection circuits 2D are connected via the transistor 45. In other words, a source of the transistor 45 is connected to the floating diffusion layer 47 of one of the detection circuits 2D. Also, a gate of the transistor 45 is connected to the floating diffusion layer 47 of the other detection circuit 2D. The transistor 45 is, for example, an NMOS transistor. In this manner, in the imaging circuit according to the present disclosure, the floating diffusion layers of the plurality of detection circuits may be connected via at least one transistor. In this manner, it is possible to output an added signal (FD added signal) of the floating diffusion layers to a circuit in the subsequent stage and to detect an object. Also, influences of noise are reduced, and a voltage output by the detection circuits is stabilized. In other words, the floating diffusion layers of at least two imaging circuits may be connected via a seventh transistor. The transistor 45 is an example of the seventh transistor.

Figure 26:
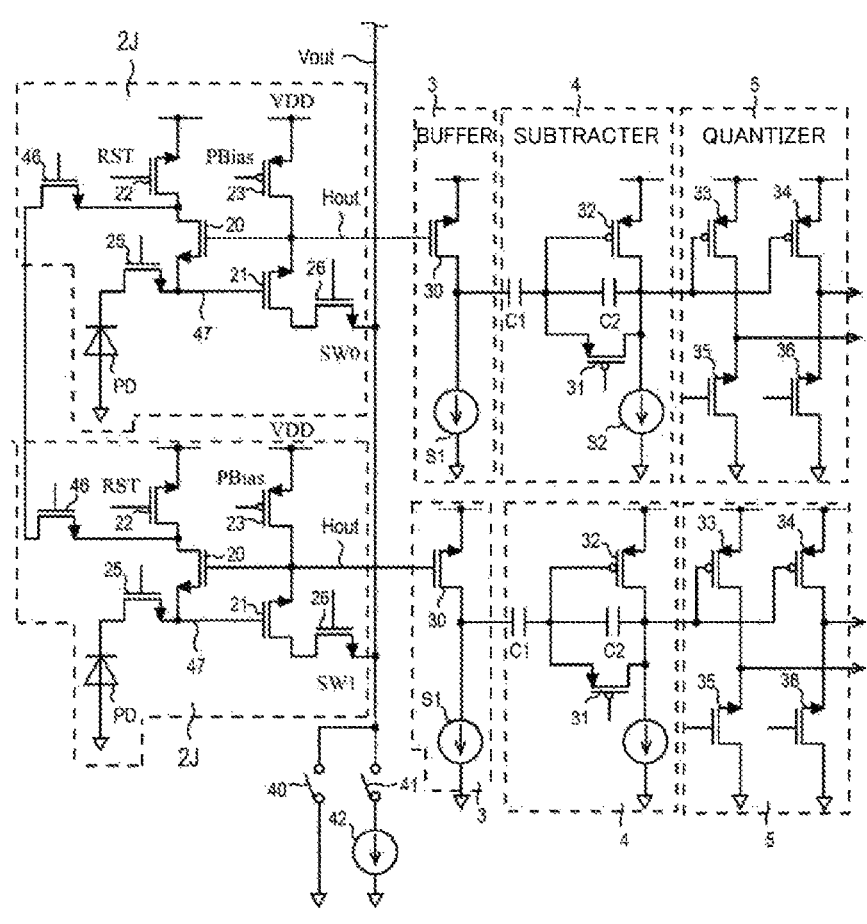
FIG. 26 is a circuit diagram illustrating an example of an imaging circuit according to a thirteenth modification example.

FIG. 26 illustrates an example of an imaging circuit according to a thirteenth modification example. A detection circuit 2J in FIG. 26 corresponds to a circuit obtained by adding a transistor 46 to the aforementioned detection circuit 2D. The transistor 46 is, for example, an NMOS transistor. A source of the transistor 46 is connected to a node that couples a drain of a transistor 22 to a drain of a transistor 20. On the other hand, a drain of the transistor 46 is connected to drains of transistors 46 of other detection circuits 2J. In this manner, in the imaging circuit according to the present disclosure, sources of reset transistors (transistors 22) in different detection circuits may be connected via at least one transistor. In this manner, it is possible to reduce influences of noise and to stabilize a voltage output by the detection circuits. In other words, second terminals of first transistors in at least two imaging circuits may be connected via an eighth transistor. The transistor 46 is an example of the eighth transistor.

Figure 27:
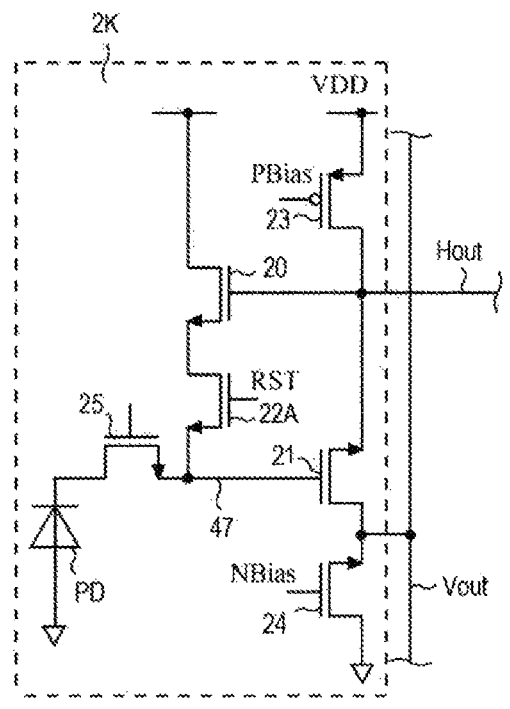
FIG. 27 is a circuit diagram illustrating an example of an imaging circuit according to a fourteenth modification example.

FIG. 27 illustrates an example of an imaging circuit according to a fourteenth modification example. A detection circuit 2K in FIG. 27 includes a photodiode PD, a transistor 20, a transistor 21, a transistor 22A, a transistor 23, and a transistor 24. The transistor 20, the transistor 21, the transistor 22A, and the transistor 24 are, for example, NMOS transistors. The transistor 23 is, for example, a PMOS transistor.

An anode of the photodiode PD is connected to a ground. On the other hand, a cathode of the photodiode PD is connected to a drain of the transistor 25. A source of the transistor 25 is connected to a gate of the transistor 21 and a source of the transistor 22A. Also, a drain of the transistor 22A is connected to a source of the transistor 20. A bias voltage RST is applied to a gate of the transistor 22A. A gate of the transistor 20 is connected to a drain of the transistor 23, a source of the transistor 21, and a signal line Hout. Among these, the signal line Hout corresponds to a first output terminal of the detection circuit 2K. The aforementioned buffer 3, for example, is connected to the first output terminal. A drain of the transistor 20 is connected to a power source potential.

A bias voltage PBias is applied to a gate of the transistor 23. Also, a source of the transistor 23 is connected to a power source potential VDD. A drain of the transistor 21 is connected to a signal line Vout via a second output terminal. Also, a drain of the transistor 21 is connected to a source of the transistor 24. A bias voltage NBias is applied to a gate of the transistor 24. Also, a drain of the transistor 24 is connected to the ground.

The transistor 20 corresponds to a conversion transistor, and the transistor 21 corresponds to an amplification transistor. On the other hand, the transistor 22A corresponds to a reset transistor (reset switch) for a voltage in the detection circuit. As illustrated in FIG. 27, the reset transistor may be connected between the conversion transistor and the floating diffusion layer rather than between the power source potential and the conversion transistor. In this manner, the position at which the reset transistor is connected is not limited in the imaging circuit according to the present disclosure.

Figure 28:
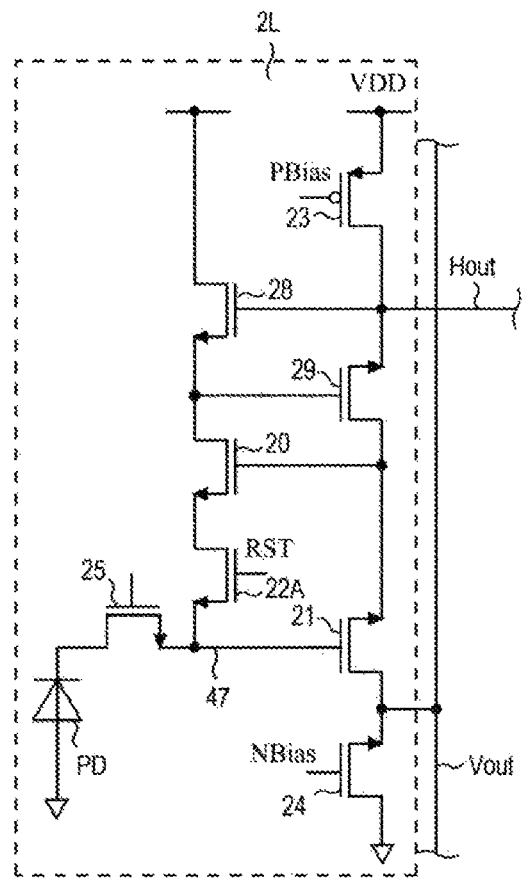
FIG. 28 is a circuit diagram illustrating an example of an imaging circuit according to a fifteenth modification example.

FIG. 28 illustrates an example of an imaging circuit according to a fifteenth modification example. A detection circuit 2L in FIG. 28 includes a photodiode PD, a transistor 20, a transistor 21, a transistor 22A, a transistor 23, a transistor 24, a transistor 28, and a transistor 29. The transistor 20, the transistor 21, the transistor 22A, the transistor 24, the transistor 28, and the transistor 29 are, for example, NMOS transistors. The transistor 23 is, for example, a PMOS transistor.

An anode of the photodiode PD is connected to a ground. On the other hand, a cathode of the photodiode PD is connected to a drain of the transistor 25. A source of the transistor 25 is connected to a source of the transistor 22A and a gate of the transistor 21. A bias voltage RST is applied to a gate of the transistor 22A. A drain of the transistor 22A is connected to a source of the transistor 20. A gate of the transistor 20 is connected to a drain of the transistor 29 and a source of the transistor 21.

In addition, a drain of the transistor 20 is connected to a source of the transistor 28 and a gate of the transistor 29. A gate of the transistor 28 is connected to a drain of the transistor 23, a source of the transistor 29, and a signal line Hout. Here, the signal line Hout corresponds to a first output terminal of the detection circuit 2L. The first output terminal is connected to the aforementioned buffer 3, for example. A drain of the transistor 28 is connected to a power source potential. A bias voltage PBias is applied to a gate of the transistor 23. Also, a source of the transistor 23 is connected to a power source potential VDD.

The detection circuit 2L includes a gain boosting-type current-voltage conversion circuit in which logarithmic conversion circuits are included in multiple stages. Even in a case in which the gain boosting-type current-voltage conversion circuit is employed, a reset transistor (reset switch) may be provided between a conversion transistor and a floating diffusion layer.

In the imaging circuit according to the present disclosure, the first transistor and the second transistor may be included in a multi-stage logarithmic transformation circuit.

The imaging circuit according to the present disclosure can be implemented in various aspects. In FIGS. 29 to 42, an element mounted on the same chip or substrate is surrounded by the thick line. Hereinafter, an implementation example of the imaging circuit according to the present disclosure will be described with reference to FIGS. 29 to 36.

Figure 29:
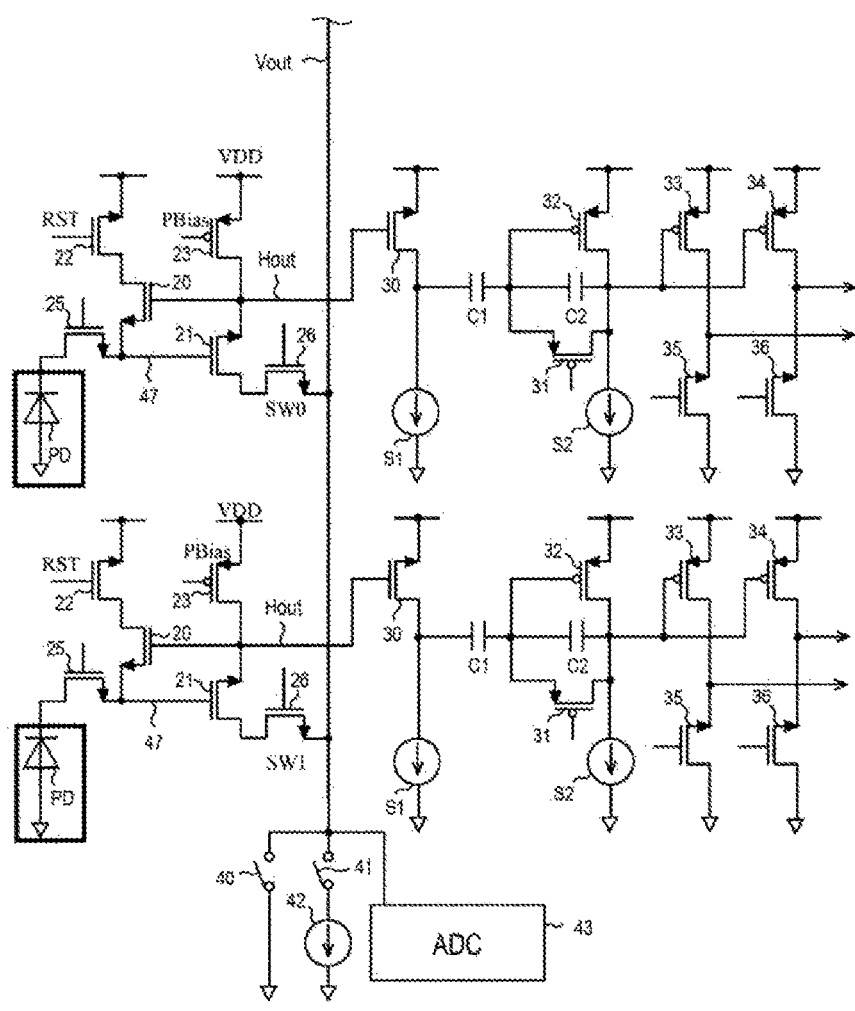
FIG. 29 is a diagram illustrating a first implementation example of the imaging circuit.
Figure 30:
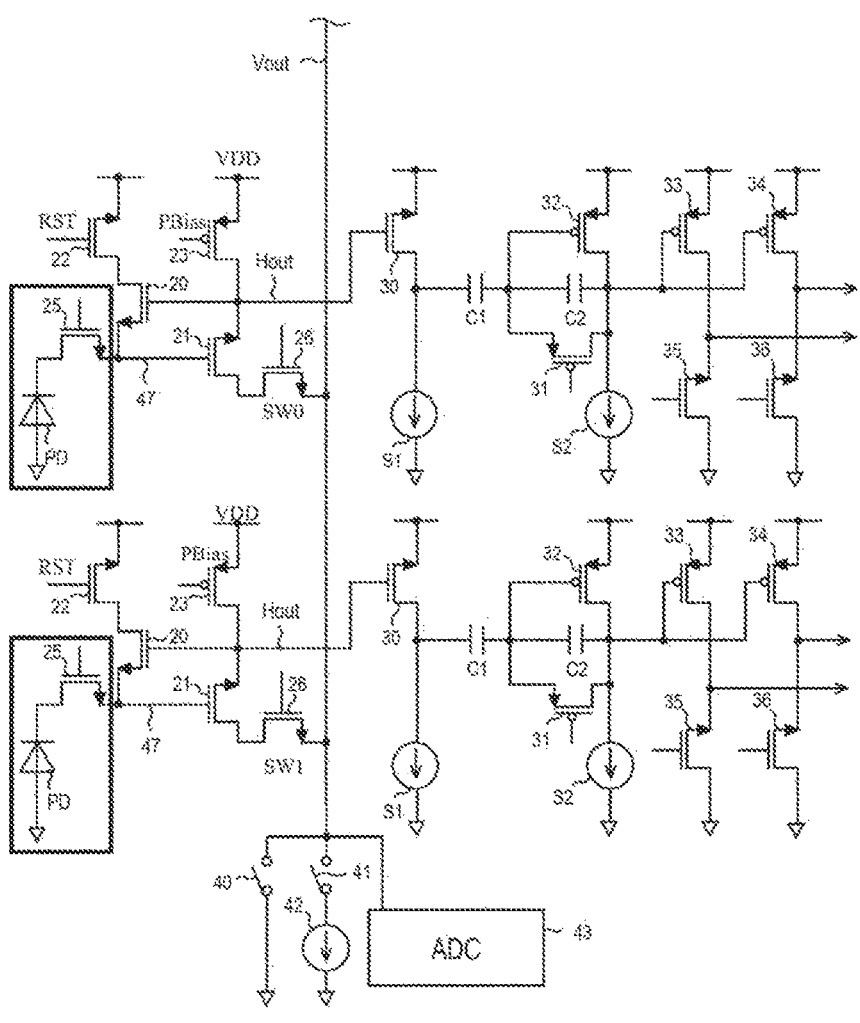
FIG. 30 is a diagram illustrating a second implementation example of the imaging circuit.

As illustrated in FIG. 29, the photodiode PD may be mounted on a chip or a substrate that is different from that of the other elements of the detection circuit. Note that in a case in which the implementation in FIG. 29 is employed, the transistor 25 (transfer gate) may be a transistor that does not perform complete transfer. Also, the transistor 25 may be omitted. Moreover, as illustrated in FIG. 30, the photodiode PD and the transistor 25 (transfer gate) may be mounted on a chip or a substrate that is different from that of the other elements of the detection circuit. In other words, in the imaging circuit according to the present disclosure, the photoelectric conversion element and the fifth transistor may be mounted on different chips or substrates.

Figure 31:
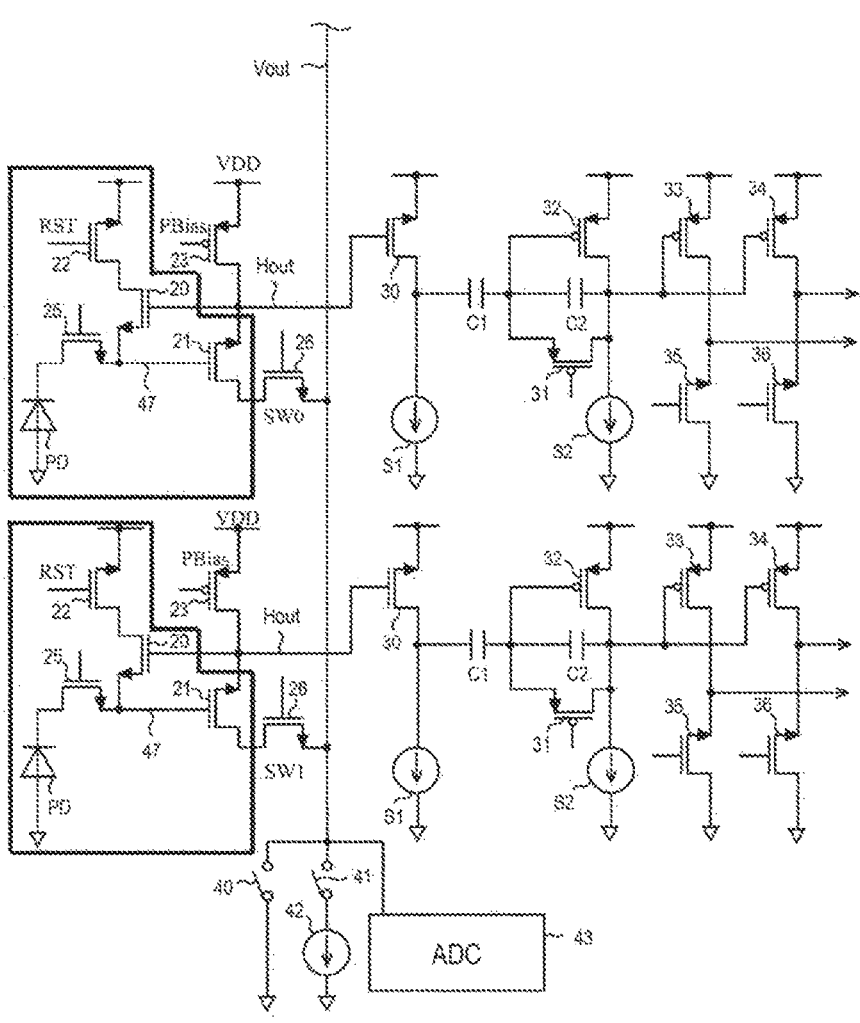
FIG. 31 is a diagram illustrating a third implementation example of the imaging circuit.

As illustrated in FIG. 31, the photodiode PD, the transistor 20, the transistor 21, the transistor 22, the transistor 25, and the floating diffusion layer 47 may be mounted on a chip or a substrate that is different from that of the other elements of the detection circuit. In a case in which the implementation in FIG. 31 is employed, the chip or the substrate has electrical connection at a plurality of locations. Also, in the implementation in FIG. 31, the transistor 26 corresponding to a switch between the detection circuit and the signal line Vout is not mounted on the same chip or substrate as that of the photodiode PD. In addition, the transistor 23 that is a PMOS transistor is not mounted on the same chip or substrate as that of the photodiode PD. Since well separation is needed by the PMOS transistor with a different conduction type from that of the other transistors in the detection circuit, a large area is occupied. Therefore, there may be a case in which it is preferably mounted on a chip or a substrate that is different from that of the photodiode PD and the NMOS transistors. A transistor with a different conduction type may be mounted on a chip or a substrate that is different from that of the photodiode in a case in which a circuit with polarities inverted from those in FIG. 31 is used as well.

Figure 32:
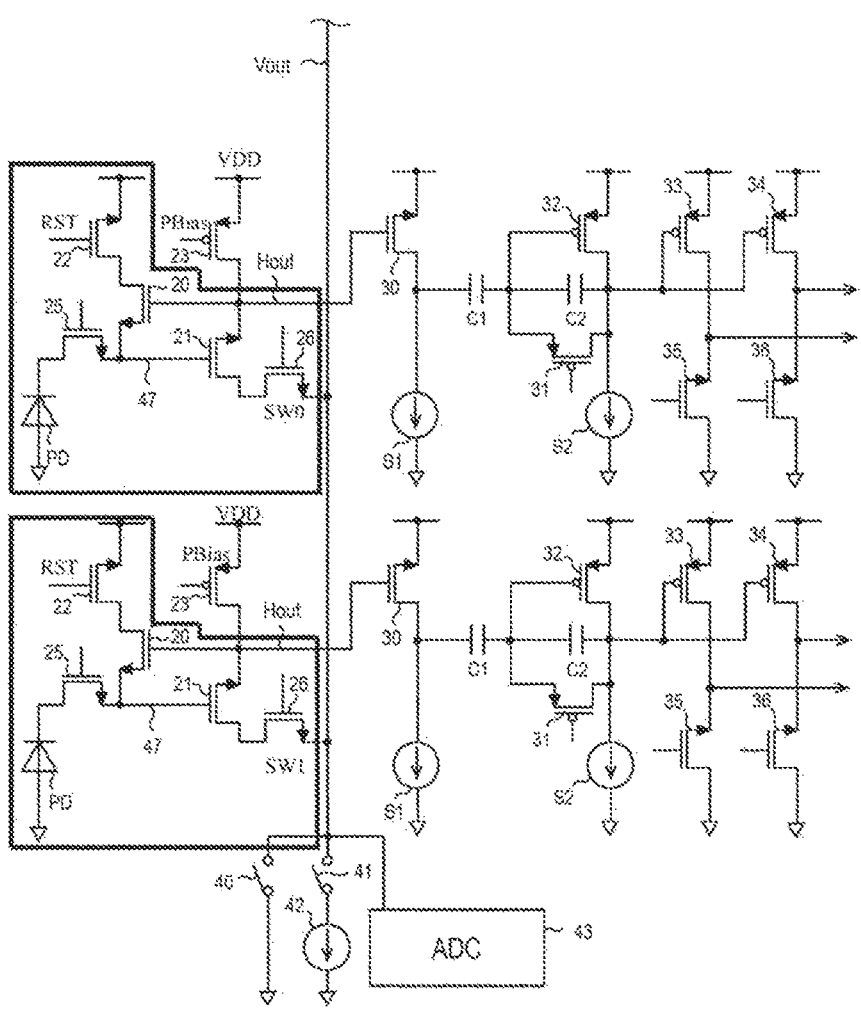
FIG. 32 is a diagram illustrating a fourth implementation example of the imaging circuit.

As illustrated in FIG. 32, elements other than the transistor 23 (PMOS transistor) with a different conduction type in the detection circuit may be mounted on the same chip or substrate. In a case in which the implementation in FIG. 32 is employed, the transistor 26 corresponding to the switch between the detection circuit and the signal line Vout is mounted on the same chip or substrate as that of the photodiode PD. In the case of FIG. 32, the signal line Vout and the circuits in the stage subsequent thereto are mounted on a chip or a substrate that is different from that of the detection circuit.

Figure 33:
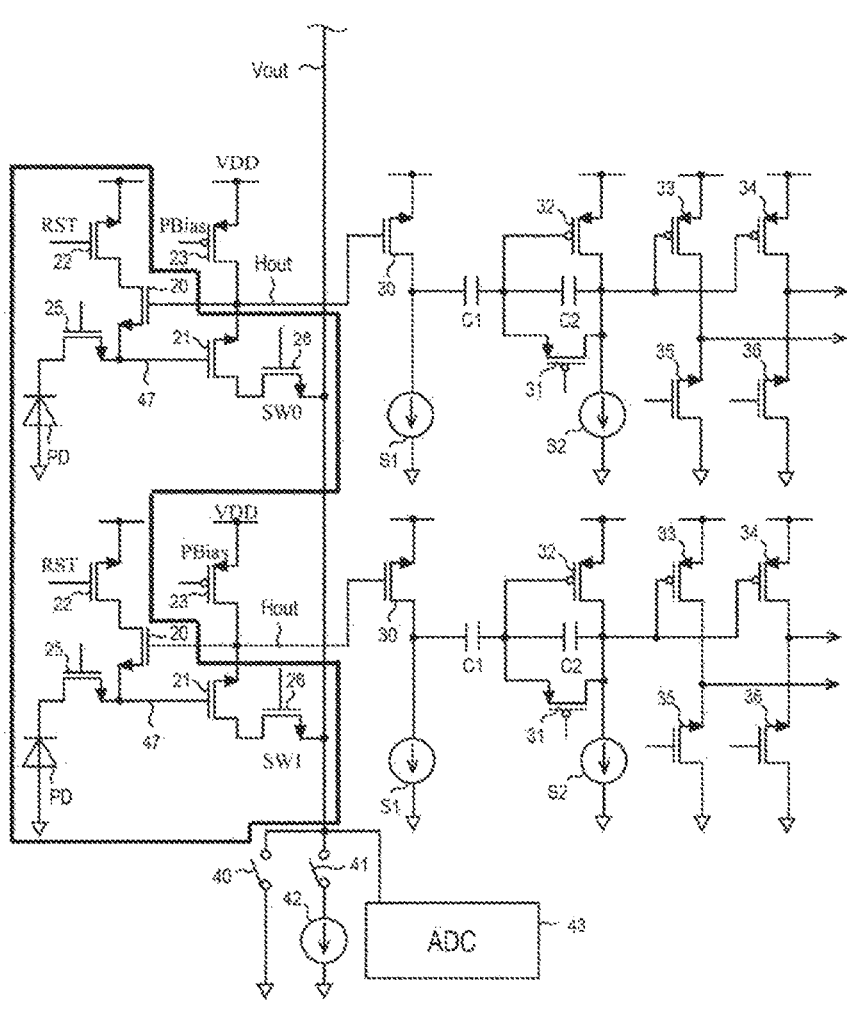
FIG. 33 is a diagram illustrating a fifth implementation example of the imaging circuit.
Figure 34:
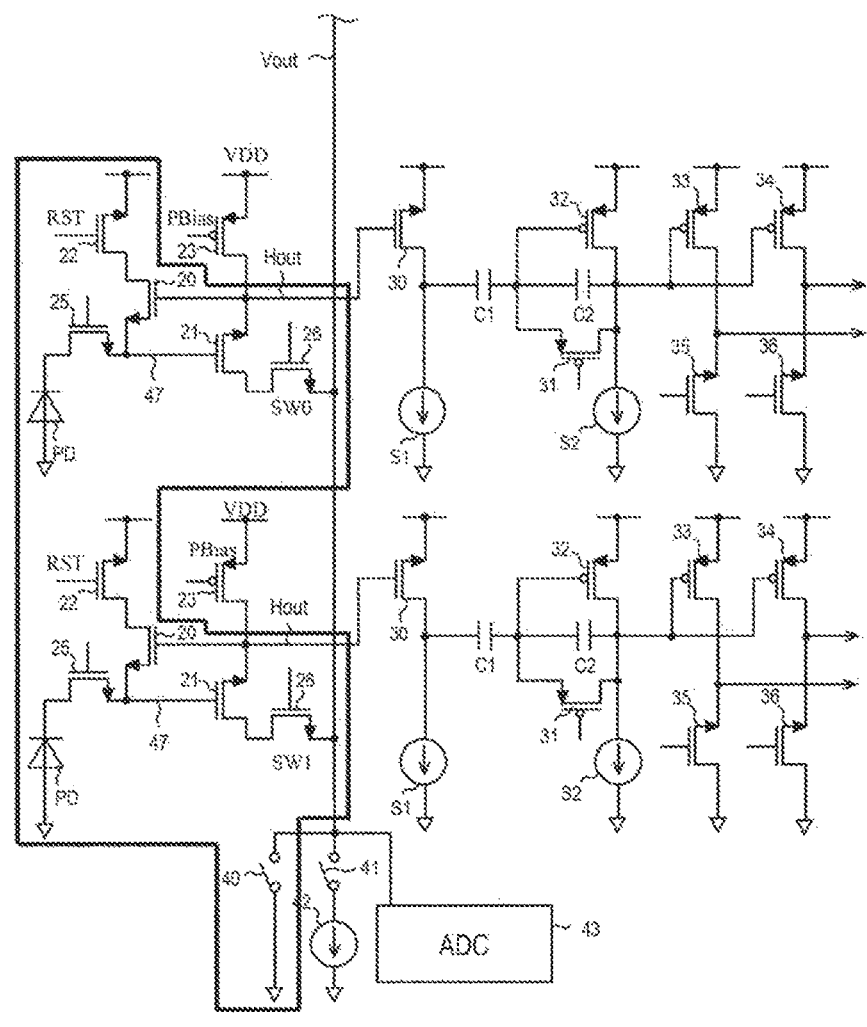
FIG. 34 is a diagram illustrating a sixth implementation example of the imaging circuit.

As illustrated in FIG. 33, the elements other than the transistor 23 (PMOS transistor) with a different conduction type and the signal line Vout in the plurality of detection circuits may be mounted on the same chip or substrate as that of the photodiode PD. In this manner, the photoelectric conversion elements, the first transistors, the second transistors, the third transistors, and the fourth transistors in the plurality of imaging circuits may be mounted on the same chip or substrate. Also, as illustrated in FIG. 34, the elements other than the transistors 23 (PMOS transistors) with a different conduction type, the signal line Vout, the switch 40, and wiring from the switch 40 to the ground (reference potential) in the plurality of detection circuits may be mounted on the same chip or substrate as that of the photodiodes PD.

Figure 35:
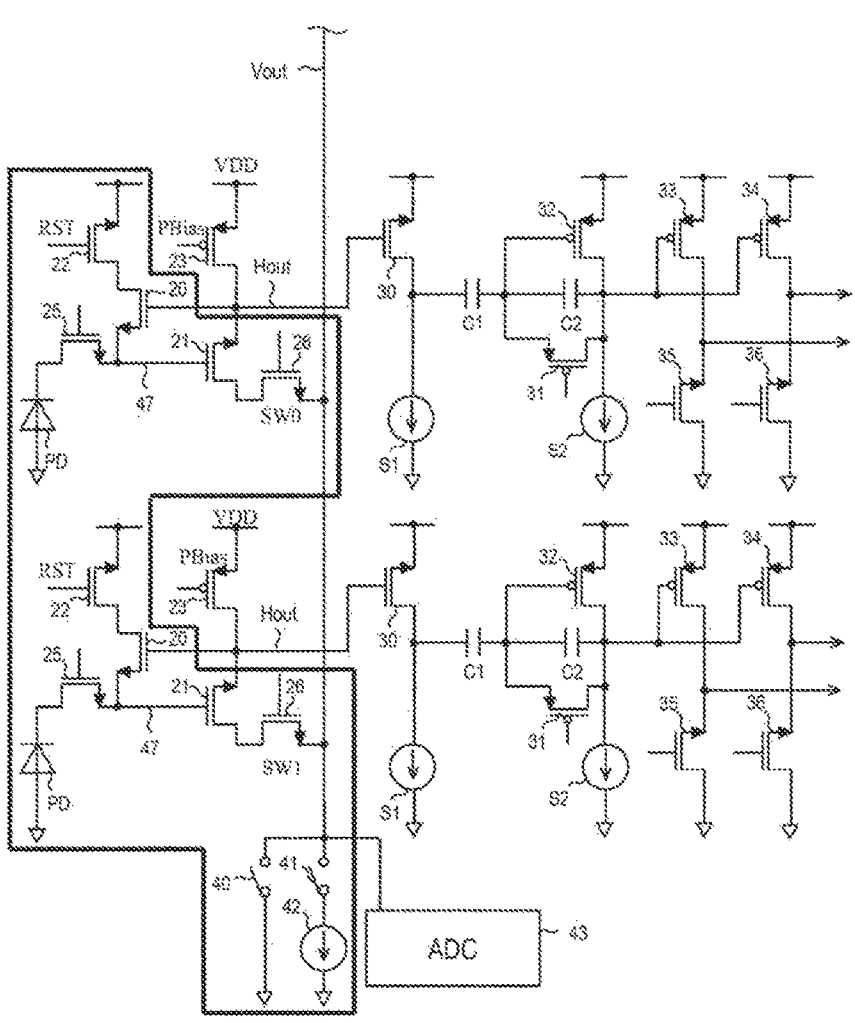
FIG. 35 is a diagram illustrating a seventh implementation example of the imaging circuit.

As illustrated in FIG. 35, the elements other than the transistors 23 (PMOS transistors) with a different conduction type, the signal line Vout, the switch 40, a wiring from the switch 40 to the ground (reference potential), the switch 41, the current source 42, and a wiring from the current source 42 to the ground (reference potential) in the plurality of detection circuits may be mounted on the same chip or substrate as that of the photodiode PD.

Figure 36:
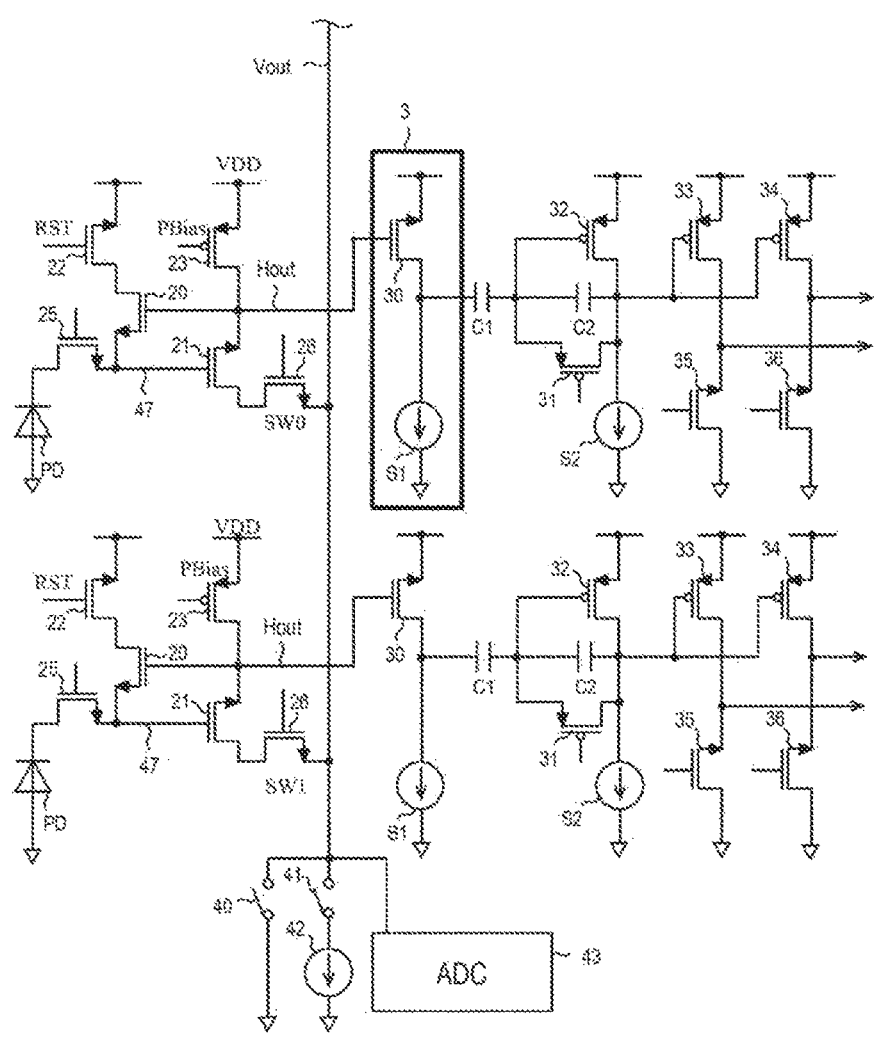
FIG. 36 is a diagram illustrating an eighth implementation example of the imaging circuit.

In FIG. 36, the buffer 3 including the transistor 30 and the current source S1 is surrounded by the thick line. The buffer 3 may be mounted on the same chip or substrate as that of the photodiode PD of the detection circuit. Also, the buffer 3 may be mounted on a chip or a substrate that is different from that of the photodiode PD of the detection circuit.

Hereinafter, an implementation example of the imaging circuit will be described with reference to FIGS. 37 to 42.

Figure 37:
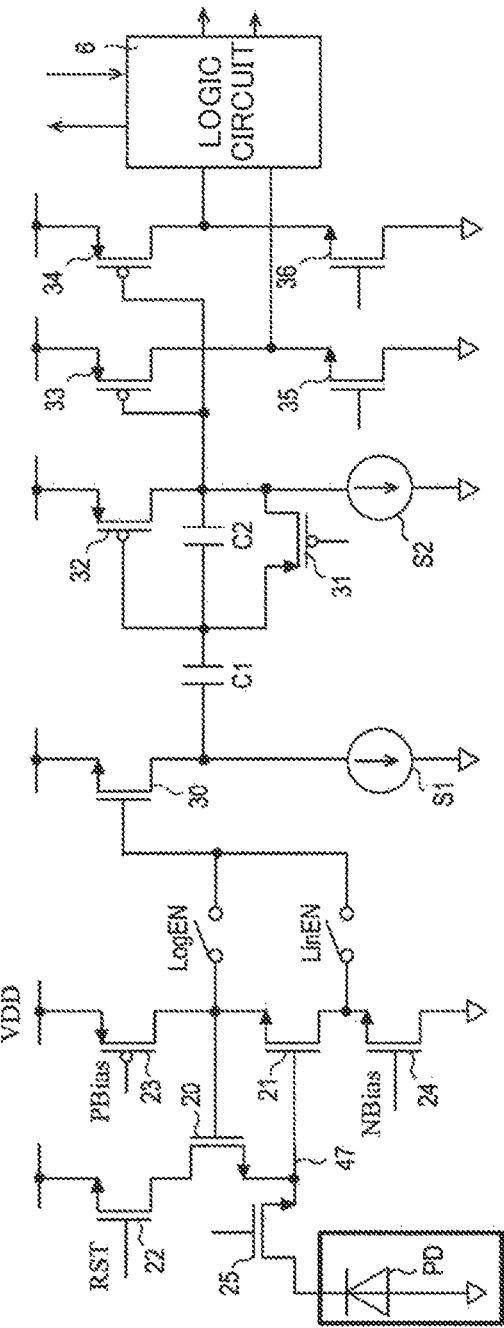
FIG. 37 is a diagram illustrating a first implementation example of the detection circuit.
Figure 38:
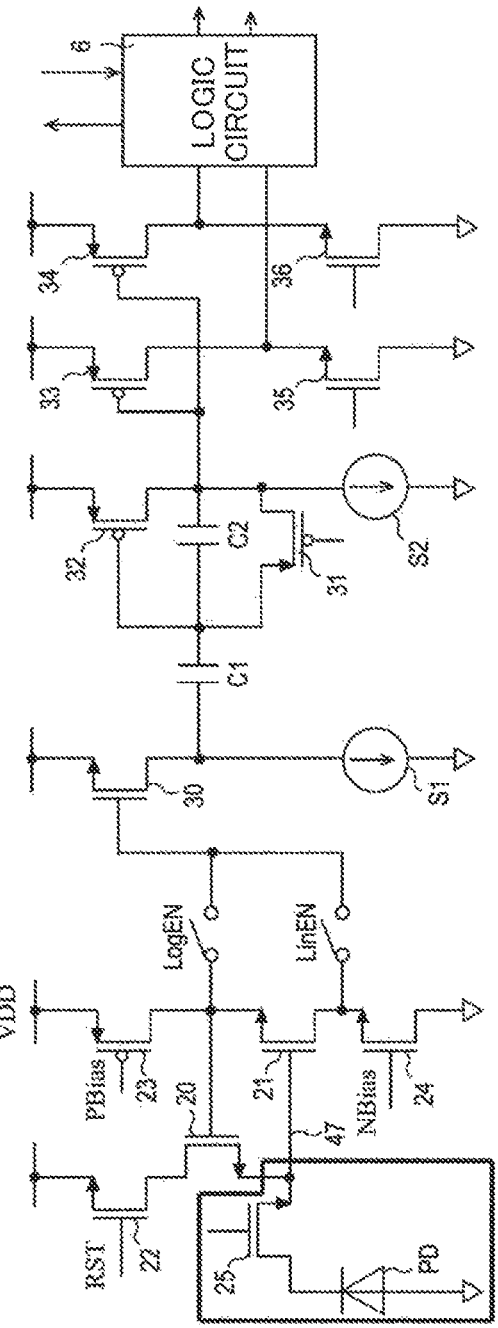
FIG. 38 is a diagram illustrating a second implementation example of the detection circuit.
Figure 39:
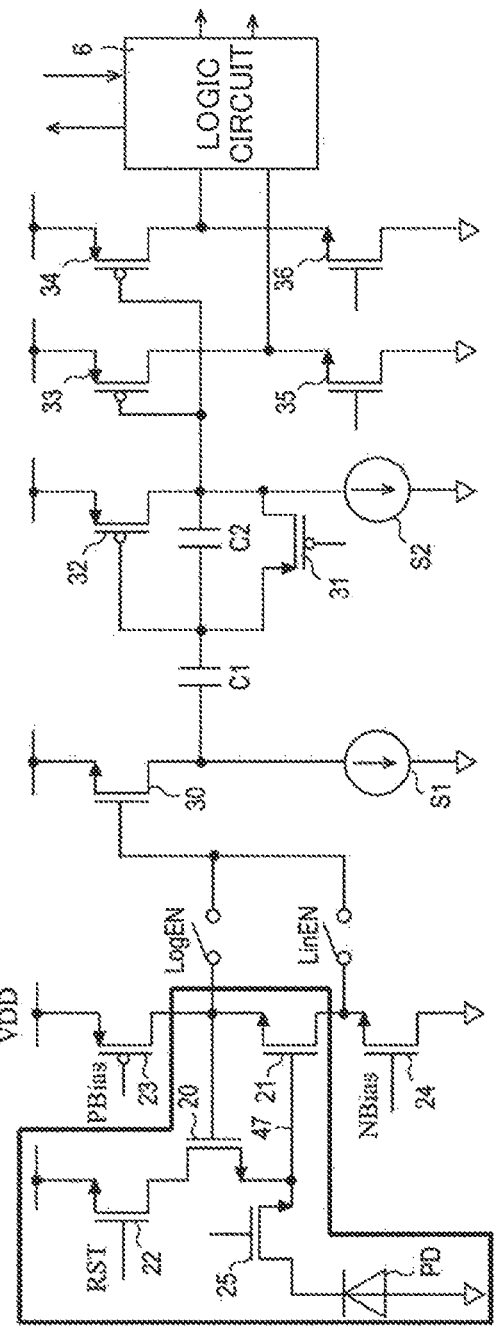
FIG. 39 is a diagram illustrating a third implementation example of the detection circuit.

As illustrated in FIG. 37, the photodiode PD may be mounted on a chip or a substrate that is different from that of the other elements of the detection circuit. Also, as illustrated in FIG. 38, the photodiode PD and the transistor 25 may be mounted on a chip or a substrate that is different from that of the other elements of the detection circuit. Moreover, as illustrated in FIG. 39, the transistor 20, the transistor 21, the transistor 22, the transistor 25, and the floating diffusion layer 47 in the detection circuit may be mounted on the same chip or substrate as that of the photodiode PD.

Figure 40:
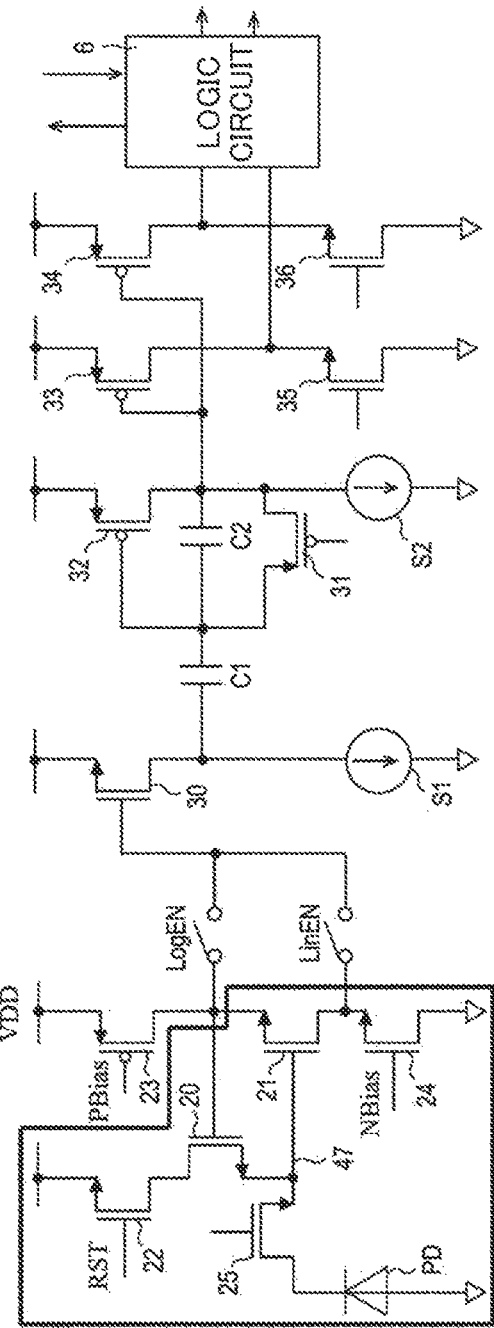
FIG. 40 is a diagram illustrating a fourth implementation example of the detection circuit.

As illustrated in FIG. 40, the photodiode PD, the transistor 20, the transistor 21, the transistor 22, the transistor 24, the transistor 25, and the floating diffusion layer 47 may be mounted on the same chip or substrate. In FIG. 40, the transistor 23 with a different conduction type from that of the other transistors in the detection circuit is mounted on a chip or a substrate that is different from that of the photodiode PD. It is thus possible to perform well separation and to realize overall size reduction of the implementation.

Figure 41:
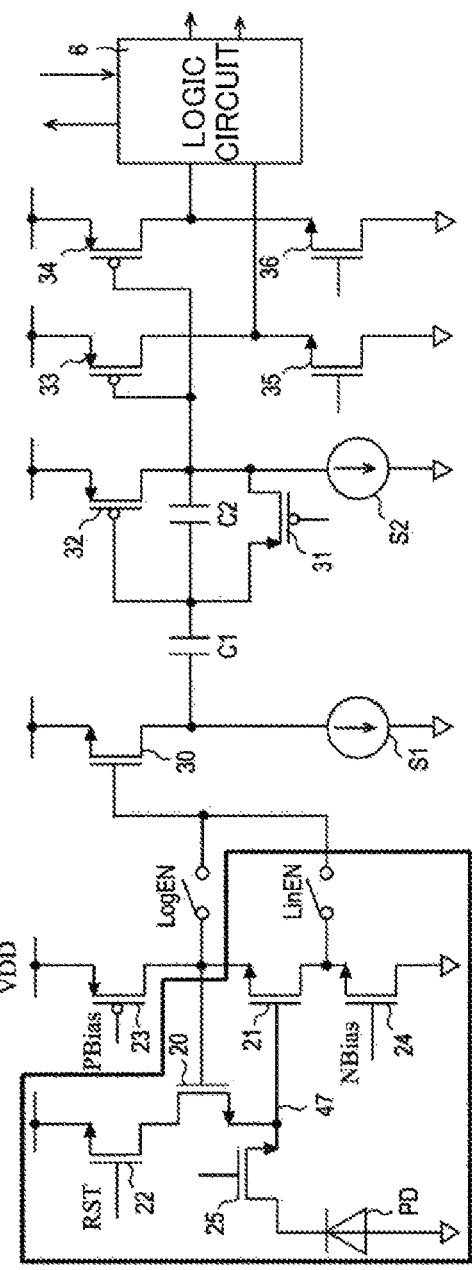
FIG. 41 is a diagram illustrating a fifth implementation example of the detection circuit.

As illustrated in FIG. 41, the photodiode PD, the transistor 20, the transistor 21, the transistor 22, the transistor 24, the transistor 25, the floating diffusion layer 47, and the switch LinEN may be mounted on the same chip or substrate. In a case in which the switch LinEN is an MOS transistor, and the transistor 20, the transistor 21, the transistor 22, the transistor 24, and the transistor 25 are of the common conduction type, for example, the implementation in FIG. 41 may be employed. However, the implementation schemes of the switch LinEN and the switch LogEN are not limited.

Figure 42:
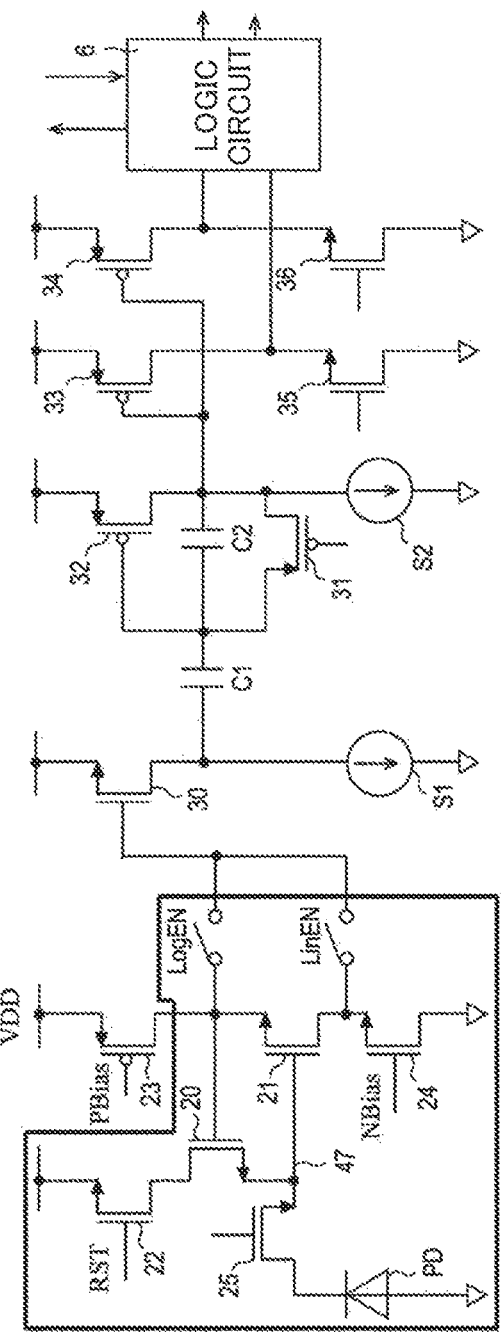
FIG. 42 is a diagram illustrating a sixth implementation example of the detection circuit.

Also, as illustrated in FIG. 42, the photodiode PD, the transistor 20, the transistor 21, the transistor 22, the transistor 24, the transistor 25, the floating diffusion layer 47, the switch LinEN, and the switch LogEN may be mounted on the same chip or substrate. In a case in which the switch LinEN and the switch LogEN are MOS transistors, and the transistor 20, the transistor 21, the transistor 22, the transistor 24, and the transistor 25 are of a common conduction type, for example, the implementation in FIG. 42 may be employed.

If the imaging circuit according to the present disclosure is used, it is possible to realize an address event circuit capable of achieving switching between the logarithmic output and the linear output while reducing the number of transistors. It is thus possible to read an event at a high speed by switching the types of output to be used in accordance with the application or the environment of the imaging circuit. It is thus possible to realize an asynchronous-type imaging element capable of generating and outputting data at a high speed while a circuit scale is reduced. For example, it is possible to execute processing of performing image recognition of persons or obstacles at a high speed and to improve safety in the field of transportation.

The technology according to the present disclosure (the present technology) can be applied to various products. For example, the technique according to the present disclosure may be realized as a device mounted on any type of moving body such as an automobile, an electric vehicle, a hybrid electric vehicle, a motorcycle, a bicycle, a personal mobility, an airplane, a drone, a ship, and a robot.

Figure 43:
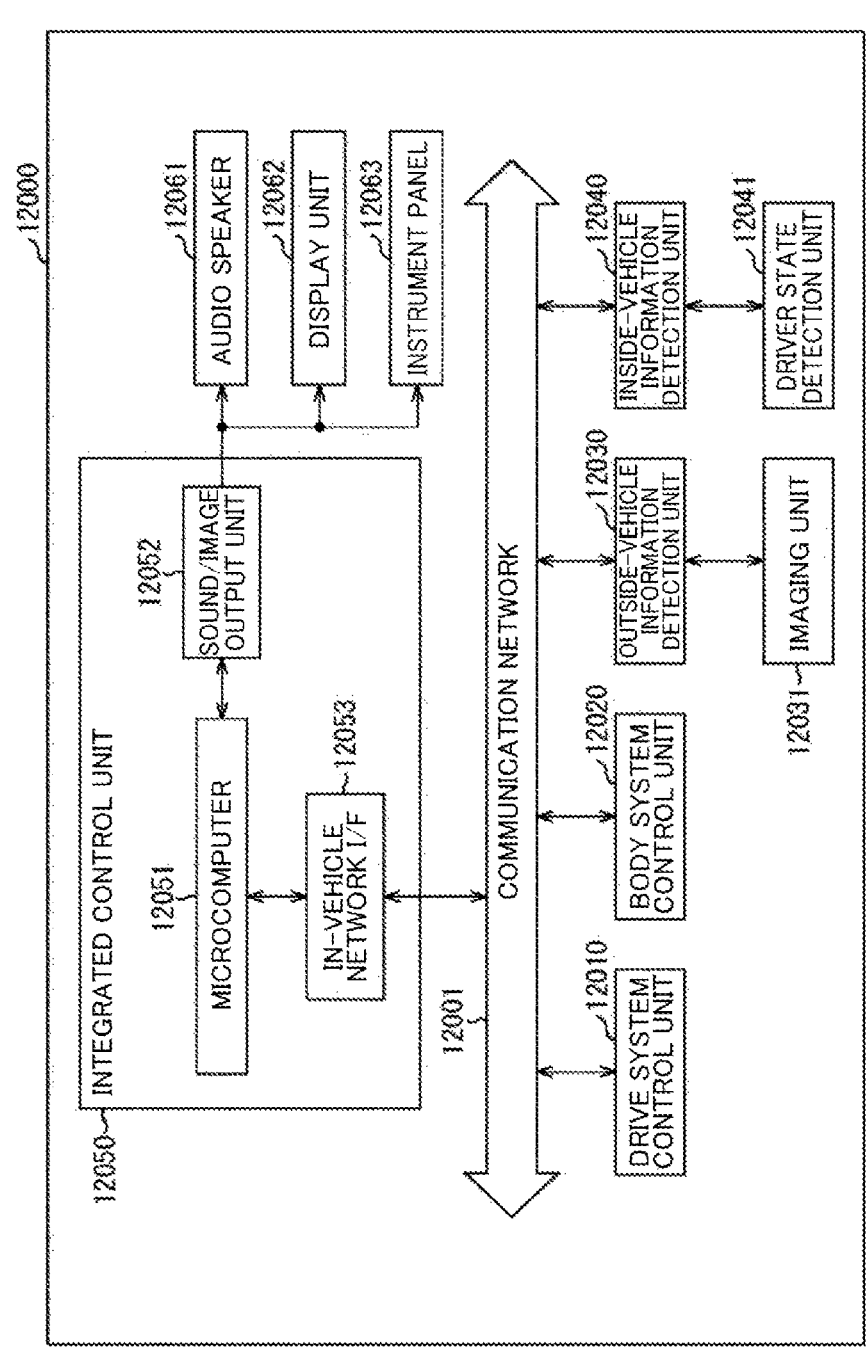
FIG. 43 is a block diagram illustrating a schematic configuration example of a vehicle control system.

FIG. 43 is a block diagram illustrating a schematic configuration example of a vehicle control system that is an example of a mobile object control system to which the technology according to the present disclosure can be applied.

A vehicle control system 12000 includes a plurality of electronic control units connected to each other via a communication network 12001. In the example illustrated in FIG. 43, the vehicle control system 12000 includes a drive system control unit 12010, a body system control unit 12020, an outside-vehicle information detection unit 12030, an inside-vehicle information detection unit 12040, and an integrated control unit 12050. In addition, a microcomputer 12051, a sound/image output unit 12052, and an in-vehicle network interface (I/F) 12053 are illustrated as functional configurations of the integrated control unit 12050.

The drive system control unit 12010 controls operations of devices related to the drive system of the vehicle in accordance with various programs. For example, the drive system control unit 12010 functions as a driving force generation device for generating a driving force of a vehicle such as an internal combustion engine or a driving motor, a driving force transmission mechanism for transmitting a driving force to wheels, a steering mechanism for adjusting a steering angle of a vehicle, and a control device such as a braking device that generates a braking force of a vehicle.

The body system control unit 12020 controls operations of various devices equipped in a vehicle body in accordance with various programs. For example, the body system control unit 12020 functions as a control device of a keyless entry system, a smart key system, a power window device, or various lamps such as a head lamp, a back lamp, a brake lamp, and a turn signal or fog lamp. In this case, radio waves transmitted from a portable device that substitutes for a key or signals of various switches may be input to the body system control unit 12020. The body system control unit 12020 receives inputs of these radio waves or signals and controls a door lock device, a power window device, a lamp, and the like of a vehicle.

The outside-vehicle information detection unit 12030 detects information outside the vehicle in which the vehicle control system 12000 is mounted. For example, an imaging unit 12031 is connected to the outside-vehicle information detection unit 12030. The outside-vehicle information detection unit 12030 causes the imaging unit 12031 to capture an image of the outside of the vehicle and receives the captured image. The outside-vehicle information detection unit 12030 may perform object detection processing or distance detection processing for peoples, cars, obstacles, signs, and letters on the road based on the received image.

The imaging unit 12031 is an optical sensor that receives light and outputs an electrical signal according to the amount of received light. The imaging unit 12031 can also output the electrical signal as an image and ranging information. In addition, the light received by the imaging unit 12031 may be visible light or invisible light such as infrared rays.

The inside-vehicle information detection unit 12040 detects information inside the vehicle. For example, a driver state detection unit 12041 that detects a state of a driver is connected to the inside-vehicle information detection unit 12040. The driver state detection unit 12041 includes, for example, a camera that captures an image of the driver, and the inside-vehicle information detection unit 12040 may calculate a degree of fatigue or concentration of the driver or may determine whether or not the driver is dozing on the basis of detection information input from the driver state detection unit 12041.

The microcomputer 12051 can calculate a control target value of the driving force generation device, the steering mechanism, or the braking device on the basis of information inside and outside the vehicle acquired by the outside-vehicle information detection unit 12030 or the inside-vehicle information detection unit 12040, and output a control command to the drive system control unit 12010. For example, the microcomputer 12051 can perform cooperative control for the purpose of realizing functions of an advanced driver assistance system (ADAS) including vehicle collision avoidance, impact mitigation, following traveling based on an inter-vehicle distance, vehicle speed maintenance driving, vehicle collision warning, vehicle lane deviation warning, and the like.

Further, by controlling the driving force generation device, the steering mechanism, the braking device, and the like on the basis of information regarding the vicinity of the vehicle acquired by the outside-vehicle information detection unit 12030 or the inside-vehicle information detection unit 12040, the microcomputer 12051 can perform cooperative control for the purpose of automated driving or the like in which autonomous travel is performed without depending on an operation of the driver.

In addition, the microcomputer 12051 can output a control command to the body system control unit 12020 on the basis of the information outside the vehicle acquired by the outside-vehicle information detection unit 12030. For example, the microcomputer 12051 can perform cooperative control for the purpose of preventing glare, such as switching from a high beam to a low beam, by controlling the headlamp according to the position of a preceding vehicle or an oncoming vehicle detected by the outside-vehicle information detection unit 12030.

The sound/image output unit 12052 transmits an output signal of at least one of sound and an image to an output device capable of visually or audibly notifying an occupant of a vehicle or the outside of the vehicle of information. In the example illustrated in FIG. 43, an audio speaker 12061, a display unit 12062, and an instrument panel 12063 are illustrated as output devices. The display unit 12062 may include, for example, at least one of an onboard display and a head-up display.

Figure 44:
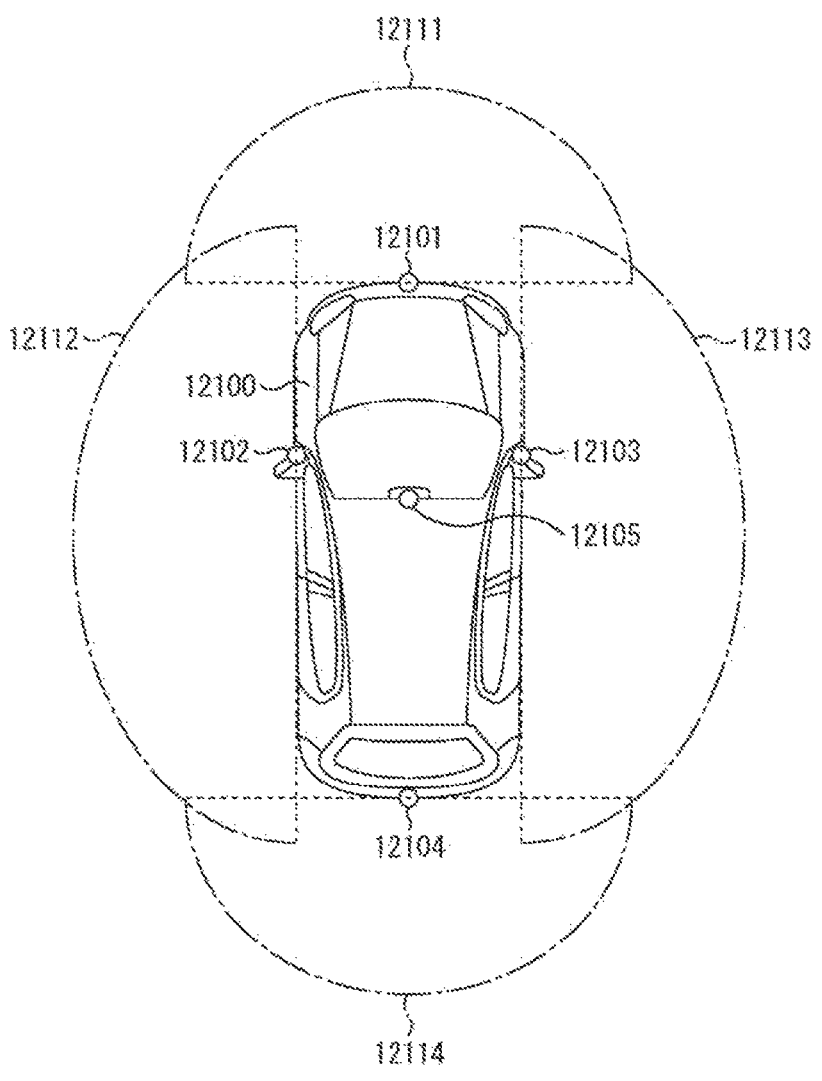
FIG. 44 is a diagram illustrating an example of positions where an imaging unit and an outside-vehicle information detection unit are mounted.

FIG. 44 is a diagram illustrating an example of an installation position of the imaging unit 12031.

In FIG. 44, a vehicle 12100 includes imaging units 12101, 12102, 12103, 12104, and 12105 as the imaging unit 12031.

The imaging units 12101, 12102, 12103, 12104, and 12105 are provided at positions such as a front nose, side-view mirrors, a rear bumper, a back door, and an upper portion of a windshield in a vehicle interior of the vehicle 12100, for example. The imaging unit 12101 provided on the front nose and the imaging unit 12105 provided in the upper portion of the windshield in the inside-vehicle mainly acquire images in front of the vehicle 12100. The imaging units 12102 and 12103 provided on the side mirrors mainly acquire images on a lateral side of the vehicle 12100. The imaging unit 12104 provided on the rear bumper or the back door mainly acquires images behind the vehicle 12100. Front view images acquired by the imaging units 12101 and 12105 are mainly used for detection of preceding vehicles, pedestrians, obstacles, traffic signals, traffic signs, lanes, and the like.

Note that FIG. 44 illustrates an example of imaging ranges of the imaging units 12101 to 12104. An imaging range 12111 indicates an imaging range of the imaging unit 12101 provided at the front nose, imaging ranges 12112 and 12113 respectively indicate imaging ranges of the imaging units 12102 and 12103 provided at the side mirrors, and an imaging range 12114 indicates an imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function of acquiring distance information. For example, at least one of the imaging units 12101 to 12104 may be a stereo camera configured of a plurality of imaging elements or may be an imaging element having pixels for phase difference detection.

For example, the microcomputer 12051 can extract, particularly, a closest three-dimensional object on a path through which the vehicle 12100 is traveling, which is a three-dimensional object traveling at a predetermined speed (for example, 0 km/h or higher) in the substantially same direction as the vehicle 12100, as a preceding vehicle by acquiring a distance to each of three-dimensional objects in the imaging ranges 12111 to 12114 and temporal change in the distance (a relative speed with respect to the vehicle 12100) on the basis of distance information obtained from the imaging units 12101 to 12104. Further, the microcomputer 12051 can set an inter-vehicle distance which should be guaranteed in advance before a preceding vehicle and can perform automated brake control (also including following stop control) or automated acceleration control (also including following start control). Thus, it is possible to perform cooperative control for the purpose of, for example, autonomous driving in which the vehicle autonomously travels without requiring the driver to perform operations.

For example, the microcomputer 12051 can classify and extract three-dimensional object data regarding three-dimensional objects into two-wheeled vehicles, ordinary vehicles, large vehicles, pedestrians, and other three-dimensional objects such as utility poles on the basis of the distance information obtained from the imaging units 12101 to 12104 and use the three-dimensional object data for automatic avoidance of obstacles. For example, the microcomputer 12051 identifies obstacles in the vicinity of the vehicle 12100 into obstacles that can be visually recognized by the driver of the vehicle 12100 and obstacles that are difficult to be visually recognized. In addition, the microcomputer 12051 determines a collision risk indicating a degree of risk of collision with each obstacle, and when the collision risk is equal to or greater than a set value and there is a possibility of collision, outputs a warning to the driver via the audio speaker 12061 or the display unit 12062 and performs forced deceleration or avoidance steering via the drive system control unit 12010, so that it can perform driving assistance for collision avoidance.

At least one of the imaging units 12101 to 12104 may be an infrared camera that detects infrared rays. For example, the microcomputer 12051 can recognize a pedestrian by determining whether there is a pedestrian in the captured images of the imaging units 12101 to 12104. Such pedestrian recognition is performed by, for example, a procedure in which feature points in the captured images of the imaging units 12101 to 12104 as infrared cameras are extracted and a procedure in which pattern matching processing is performed on a series of feature points indicating the outline of the object and whether the object is a pedestrian is determined. When the microcomputer 12051 determines that there is a pedestrian in the captured images of the imaging units 12101 to 12104, and the pedestrian is recognized, the sound/image output unit 12052 controls the display unit 12062 such that the recognized pedestrian is superimposed and displayed with a square contour line for emphasis. In addition, the sound/image output unit 12052 may control the display unit 12062 so that an icon indicating a pedestrian or the like is displayed at a desired position.

An example of the vehicle control system to which the technique according to the present disclosure may be applied has been described hitherto. The technique according to the present disclosure may be applied to the imaging unit 12031 and the like among the configurations described above. Specifically, it is possible to mount a distance measurement device 90 including the aforementioned imaging circuit and a light source 91 on the imaging unit 12031. It is possible to obtain accurate distance information and to enhance functionality and safety of the vehicle 12100 in an environment with a wide brightness dynamic range by applying the technology according to the present disclosure to the imaging unit 12031.

Note that the present technique may also have the following configurations.

(1) An imaging circuit including: a photoelectric conversion element that converts incident light into a photocurrent; a first transistor that converts the photocurrent into a voltage signal; a second transistor that amplifies the voltage signal; a third transistor that controls a current to be supplied to the first transistor; and a fourth transistor that is connected to the second transistor.

(2) The imaging circuit according to claim 1, further including: a fifth transistor that is connected between a first node that couples a control electrode of the first transistor to a first terminal of the second transistor and a first reference potential.

(3) The imaging circuit according to (2), wherein a buffer, a subtracter, and a quantizer are connected to a stage subsequent to the first node.

(4) The imaging circuit according to (2) or (3), further including: a control unit that is configured to be able to achieve switching between a first mode in which the third transistor and the fourth transistor are turned on and the fifth transistor is used as a current source and a second mode in which a pulse voltage is applied to a control electrode of the third transistor, the fourth transistor is turned on, and the fifth transistor is turned off.

(5) The imaging circuit according to (4), in which the control unit is configured to achieve the switching between the first mode and the second mode in accordance with the measured amount of light.

(6) The imaging circuit according to any one of (1) to (5), further including: a sixth transistor that is connected between the photoelectric conversion element and a second node that couples a first terminal of the first transistor to a control electrode of the second transistor.

(7) The imaging circuit according to any one of (1) to (6), in which the first transistor and the second transistor are included in a multi-stage logarithmic transformation circuit.

(8) The imaging circuit according to any one of (2) to (5), further including: a sixth transistor that is connected between a third node that couples a second terminal of the second transistor to a second terminal of the fourth transistor and a second reference potential.

(9) The imaging circuit according to (8), further including: a control unit that is configured to be able to achieve switching between a first mode in which the third transistor is turned on, the fourth transistor is turned off, the fifth transistor is used as a current source, and the sixth transistor is turned on and a second mode in which a pulse voltage is applied to a control electrode of the third transistor, the fourth transistor is turned on, the fifth transistor is turned off, and the sixth transistor is turned off.

(10) The imaging circuit according to any one of (2) to (4), further including a first switch with a stage therebefore to which the control electrode of the first transistor and the first terminal of the second transistor are connected and a second switch with a stage therebefore to which a second terminal of the second transistor and a first terminal of the fourth transistor are connected, in which the fourth transistor is connected between the second transistor and a second reference potential.

(11) The imaging circuit according to (10), in which a buffer, a subtracter, and a quantizer are connected to a stage subsequent to the first switch, and an analog-digital converter is connected to a stage subsequent to the second switch.

(12) The imaging circuit according to (11), further including: a control unit that is configured to be able to achieve switching between a first mode in which the third transistor and the fourth transistor are turned on, the fifth transistor is used as a current source, the first switch is turned on, and the second switch is turned off and a second mode in which a pulse voltage is applied to a control electrode of the third transistor, the fourth transistor is turned on, the fifth transistor is turned off, the first switch is turned off, and the second switch is turned on.

(13) The imaging circuit according to any one of (2) to (4), in which the photoelectric conversion element and the fifth transistor are mounted on different chips or substrates.

(14) An imaging device including: an analog-digital converter; and a plurality of the imaging circuits according to any one of claims 1 to 5, in which the first terminal of the fourth transistor in each of the imaging circuits is connected to the analog-digital converter via a signal line.

(15) The imaging device according to (14), further including: a third switch, a fourth switch, and a current source, in which the third switch is connected between the signal line and a second reference potential, and the fourth switch and the current source are connected in series between the signal line and the second reference potential.

(16) The imaging device according to (15), further including: a control unit that is configured to be able to achieve switching between a first mode in which a third transistor and the fourth transistor are turned on, a fifth transistor is used as a current source, the third switch is turned on, and the fourth switch is turned off and a second mode in which a pulse voltage is applied to a control electrode of the third transistor, the fourth transistor is turned on, the fifth transistor is turned off, the third switch is turned on, and the fourth switch is turned off.

(17) The imaging device according to (16), in which the control unit is configured to achieve switching between the first mode and the second mode in accordance with the measured amount of light.

(18) The imaging device according to (14) or (15), in which floating diffusion layers in the at least two imaging circuits are connected via a seventh transistor.

(19) The imaging device according to (14) or (15), in which second terminals of first transistors in the at least two imaging circuits are connected via an eighth transistor.

(20) The imaging device according to (14), in which the photoelectric conversion elements, first transistors, second transistors, third transistors, and the fourth transistors of the plurality of imaging circuits are mounted on the same chip or substrate.

Aspects of the present disclosure are not limited to the aforementioned individual embodiments and include various modifications that those skilled in the art can achieve, and effects of the present disclosure are also not limited to the details described above. In other words, various additions, modifications, and partial deletion can be made without departing from the conceptual idea and the gist of the present disclosure that can be derived from the details defined in the claims and the equivalents thereof.

REFERENCE SIGNS LIST

Hout, Vout Signal line
PD Photodiode
S1, S2, 42 Current source
2 Logarithmic transformation circuit
2A, 2B, 2C, 2D, 2E, 2F, 2G, 2H, 2I, 2J, 2K, 2L, 2d Detection circuit
3, 320 Buffer
4, 330 Subtracter
5,340 Quantizer
6 Logic circuit
40, 41 Switch
42 Current source
43 Analog-digital converter (ADC)
100 Imaging device
300 Address event detection circuit
310 Current-voltage conversion circuit
350 Transfer circuit

What is claimed is:

1. A detection circuit for an imaging circuit, wherein the detection circuit comprises:
a photoelectric conversion element that converts incident light into a photocurrent;
a first transistor that converts the photocurrent into a voltage signal;
a second transistor that amplifies the voltage signal;
a third transistor that controls a current to be supplied to the first transistor; and
a fourth transistor that is connected to the second transistor, wherein an amount of the incident light is measured using a pixel with an adjusted exposure time or analog gain, wherein a drain of the second transistor is directly connected to a drain of the fourth transistor, wherein a source of the second transistor is directly connected to a first output terminal of the detection circuit, wherein the first output terminal is directly connected to a stage of the imaging circuit subsequent to the first output terminal to provide an output current signal to the stage, and wherein a source of the fourth transistor is directly connected to a second output terminal of the detection circuit to provide an output voltage signal to a stage of the imaging circuit subsequent to the second output terminal.

2. The detection circuit according to claim 1, further comprising:
a fifth transistor that is connected to the first output terminal, a gate of the first transistor, and the source of the second transistor, wherein a gate of the fifth transistor is connected to a first reference potential.

3. The detection circuit according to claim 1, wherein a buffer, a subtracter, and a quantizer are connected to the stage subsequent to the first output terminal.

4. The detection circuit according to claim 2, further comprising:
a controller that is configured to be able to achieve switching between a first mode in which the third transistor and the fourth transistor are turned on and the fifth transistor is used as a current source, and a second mode in which a pulse voltage is applied to a gate of the third transistor, the fourth transistor is turned on, and the fifth transistor is turned off.

5. The detection circuit according to claim 4, wherein the controller is configured to achieve switching between the first mode and the second mode in accordance with the measured amount of light.

6. The detection circuit according to claim 1, further comprising:
a sixth transistor, wherein a drain of the sixth transistor is connected to the photoelectric conversion element, and wherein source of the sixth transistor is connected to a source of the first transistor and a gate of the second transistor.

7. The detection circuit according to claim 1, wherein the first transistor and the second transistor are included in a multi-stage logarithmic transformation circuit.

8. The detection circuit according to claim 2, further comprising:
a sixth transistor that is connected between a node that couples the second transistor to the fourth transistor and a second reference potential.

9. The detection circuit according to claim 8, further comprising:
a controller that is configured to be able to achieve switching between a first mode in which the third transistor is turned on, the fourth transistor is turned off, the fifth transistor is used as a current source, and the sixth transistor is turned on, and a second mode in which a pulse voltage is applied to a control electrode of the third transistor, the fourth transistor is turned on, the fifth transistor is turned off, and the sixth transistor is turned off.

10. The detection circuit according to claim 2, wherein the photoelectric conversion element and the fifth transistor are mounted on different chips or substrates.

11. An imaging device, comprising:
an analog-digital converter; and
a plurality of detection circuits, each detection circuit of the plurality of detection circuits comprising:
a photoelectric conversion element that converts incident light into a photocurrent;

a first transistor that converts the photocurrent into a voltage signal;
a second transistor that amplifies the voltage signal;
a third transistor that controls a current to be supplied to the first transistor; and
a fourth transistor that is connected to the second transistor, wherein a drain of the second transistor is directly connected to a drain of the fourth transistor, wherein a source of the second transistor is directly connected to a first output terminal of each detection circuit, wherein the first output terminal is directly connected to a stage of each detection circuit to provide an output current signal to the stage, wherein a source of the fourth transistor is directly connected to a second output terminal of each detection circuit to provide a voltage output signal to the analog-digital converter via a signal line, and wherein an amount of the incident light is measured using a pixel with an adjusted exposure time or analog gain.

12. The imaging device according to claim 11, further comprising:
a third switch;
a fourth switch; and
a current source,
wherein the third switch is connected between the signal line and a second reference potential, and
wherein the fourth switch and the current source are connected in series between the signal line and the second reference potential.

13. The imaging device according to claim 12, further comprising:
a controller that is configured to be able to achieve switching between a first mode in which a third transistor and the fourth transistor are turned on, a fifth transistor is used as a current source, the third switch is turned on, and the fourth switch is turned off, and a second mode in which a pulse voltage is applied to a gate of the third transistor, the fourth transistor is turned on, the fifth transistor is turned off, the third switch is turned off, and the fourth switch is turned on.

14. The imaging device according to claim 13, wherein the controller is configured to achieve switching between the first mode and the second mode in accordance with the measured amount of light.

15. The imaging device according to claim 11, wherein floating diffusion layers in at least two imaging circuits of the plurality of imaging circuits are connected via a seventh transistor.

16. The imaging device according to claim 11, wherein drains of first transistors in at least two detection circuits of the plurality of detection circuits are connected via an eighth transistor.

17. The imaging device according to claim 11, wherein the photoelectric conversion element, the first transistor, the second transistor, the third transistor, and the fourth transistor of each detection circuit of the plurality of detection circuits are mounted on the same chip or substrate.

* * * * *